US008429244B2

(12) United States Patent  (10) Patent No.: US 8,429,244 B2
Naimark et al.                (45) Date of Patent:  *Apr. 23, 2013

(54) ALERTING USERS TO ITEMS OF CURRENT INTEREST

(75) Inventors: Michael Naimark, San Francisco, CA (US); Aviv Bergman, Palo Alto, CA (US); Emily Weil, New York, NY (US); Ignazio Moresco, Brooklyn, NY (US); Baldo Faieta, San Francisco, CA (US)

(73) Assignee: Interval Licensing LLC, Seattle, WA (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/411,500

(22) Filed: Mar. 26, 2009

(65) Prior Publication Data

US 2009/0198774 A1   Aug. 6, 2009

Related U.S. Application Data

(63) Continuation of application No. 10/800,393, filed on Mar. 12, 2004, now abandoned, which is a continuation of application No. 09/656,638, filed on Sep. 7, 2000, now Pat. No. 6,757, 682.

(60) Provisional application No. 60/178,627, filed on Jan. 28, 2000.

(51) Int. Cl.
  *G06F 15/16*  (2006.01)
(52) U.S. Cl.
  USPC ........... 709/217; 709/203; 709/206; 707/748; 707/758

(58) Field of Classification Search .................. 709/203, 709/206
See application file for complete search history.

(56) References Cited

U.S. PATENT DOCUMENTS

| 3,868,675 A | 2/1975 | Firmin |
| 3,884,403 A | 5/1975 | Brewer |
| 3,919,475 A | 11/1975 | Dukich et al. |
| 4,033,335 A | 7/1977 | Nickles |
| 4,051,534 A | 9/1977 | Dukich et al. |
| 4,131,919 A | 12/1978 | Lloyd et al. |
| 4,217,609 A | 8/1980 | Hatori et al. |
| 4,260,229 A | 4/1981 | Bloomstein |
| 4,283,735 A | 8/1981 | Jagger |

(Continued)

FOREIGN PATENT DOCUMENTS

| DE | 4408131 | 7/1995 |
| EP | 179701 | 4/1986 |

(Continued)

OTHER PUBLICATIONS

"About Upoc," http://www.upoc.com/about.jsp, Sep. 25, 2000, 1 page.

(Continued)

*Primary Examiner* — Backhean Tiv
(74) *Attorney, Agent, or Firm* — Edell, Shapiro & Finnan, LLC

(57) ABSTRACT

Disseminating to a participant an indication that an item accessible by the participant via a network is of current interest is disclosed. An indication that the item is of current interest is received in real time. The indication is processed. The participant is informed that the item is of current interest.

79 Claims, 14 Drawing Sheets

U.S. PATENT DOCUMENTS

| | | | |
|---|---|---|---|
| 4,319,286 A | 3/1982 | Hanpachern | |
| 4,390,904 A | 6/1983 | Johnston et al. | |
| 4,446,997 A | 5/1984 | Himberg | |
| 4,520,404 A | 5/1985 | Von Kohorn | |
| 4,524,381 A | 6/1985 | Konishi | |
| 4,526,308 A | 7/1985 | Dovey | |
| 4,527,201 A | 7/1985 | Cappels | |
| 4,536,066 A | 8/1985 | Bauer et al. | |
| 4,554,418 A * | 11/1985 | Toy | 379/88.01 |
| 4,574,354 A | 3/1986 | Mihalik et al. | |
| 4,602,297 A | 7/1986 | Reese | |
| 4,605,964 A | 8/1986 | Chard et al. | |
| 4,605,973 A | 8/1986 | Von Kohorn | |
| 4,618,895 A | 10/1986 | Wright | |
| 4,714,184 A | 12/1987 | Young et al. | |
| 4,739,398 A | 4/1988 | Thomas et al. | |
| 4,750,052 A | 6/1988 | Poppy et al. | |
| 4,750,053 A | 6/1988 | Allen | |
| 4,777,537 A | 10/1988 | Ueno et al. | |
| 4,782,401 A | 11/1988 | Faerber et al. | |
| 4,814,876 A | 3/1989 | Horio et al. | |
| 4,827,532 A | 5/1989 | Bloomstein | |
| 4,837,817 A | 6/1989 | Maemori et al. | |
| 4,841,575 A | 6/1989 | Welsh et al. | |
| 4,843,484 A | 6/1989 | Kanamaru et al. | |
| 4,845,658 A | 7/1989 | Gifford | |
| 4,847,543 A | 7/1989 | Fellinger | |
| 4,913,539 A | 4/1990 | Lewis | |
| 4,930,160 A | 5/1990 | Vogel et al. | |
| 4,934,821 A | 6/1990 | Morton | |
| 4,965,825 A | 10/1990 | Harvey et al. | |
| 4,989,104 A | 1/1991 | Schulein et al. | |
| 5,012,334 A | 4/1991 | Etra | |
| 5,012,335 A | 4/1991 | Cohodar | |
| 5,025,394 A | 6/1991 | Parke | |
| 5,038,217 A | 8/1991 | Hayashi et al. | |
| 5,040,081 A | 8/1991 | McCutchen | |
| 5,105,184 A | 4/1992 | Pirani et al. | |
| 5,109,482 A | 4/1992 | Bohrman | |
| 5,136,655 A | 8/1992 | Bronson | |
| 5,146,353 A | 9/1992 | Isoguchi et al. | |
| 5,157,742 A | 10/1992 | Niihara et al. | |
| 5,172,281 A | 12/1992 | Ardis et al. | |
| 5,175,769 A | 12/1992 | Hejna, Jr. et al. | |
| 5,177,796 A | 1/1993 | Feig et al. | |
| 5,179,449 A | 1/1993 | Doi et al. | |
| 5,182,641 A | 1/1993 | Diner et al. | |
| 5,185,667 A | 2/1993 | Zimmermann | |
| 5,187,571 A | 2/1993 | Braun et al. | |
| 5,226,093 A | 7/1993 | Iwase et al. | |
| 5,233,654 A | 8/1993 | Harvey et al. | |
| 5,239,428 A | 8/1993 | Nishida et al. | |
| 5,241,428 A | 8/1993 | Goldwasser et al. | |
| 5,249,289 A | 9/1993 | Thamm et al. | |
| 5,253,061 A | 10/1993 | Takahama et al. | |
| 5,253,066 A | 10/1993 | Vogel | |
| 5,253,275 A | 10/1993 | Yurt et al. | |
| 5,262,856 A | 11/1993 | Lippman et al. | |
| 5,265,180 A | 11/1993 | Golin | |
| 5,267,042 A | 11/1993 | Tsuchiya et al. | |
| 5,295,064 A | 3/1994 | Malec et al. | |
| 5,295,089 A | 3/1994 | Ambasz | |
| 5,299,019 A | 3/1994 | Pack et al. | |
| 5,305,195 A | 4/1994 | Murphy | |
| 5,305,400 A | 4/1994 | Butera et al. | |
| 5,309,234 A | 5/1994 | Kranawetter et al. | |
| 5,317,730 A | 5/1994 | Moore et al. | |
| 5,329,320 A | 7/1994 | Yifrach et al. | |
| 5,333,091 A | 7/1994 | Iggulden et al. | |
| 5,343,251 A | 8/1994 | Nafeh | |
| 5,347,632 A | 9/1994 | Filepp et al. | |
| 5,377,051 A | 12/1994 | Lane et al. | |
| 5,384,703 A | 1/1995 | Withgott et al. | |
| 5,396,287 A | 3/1995 | Cho et al. | |
| 5,396,583 A | 3/1995 | Chen et al. | |
| 5,404,316 A | 4/1995 | Klingler et al. | |
| 5,406,626 A | 4/1995 | Ryan | |
| 5,416,310 A | 5/1995 | Little | |
| 5,420,801 A | 5/1995 | Dockter et al. | |
| 5,421,031 A | 5/1995 | De Bey et al. | |
| 5,428,774 A | 6/1995 | Takahashi et al. | |
| 5,428,778 A | 6/1995 | Brookes | |
| 5,436,542 A | 7/1995 | Petelin et al. | |
| 5,436,637 A | 7/1995 | Gayraud et al. | |
| 5,436,653 A | 7/1995 | Ellis et al. | |
| 5,438,357 A | 8/1995 | McNelley | |
| 5,438,362 A | 8/1995 | Tabuchi et al. | |
| 5,438,423 A | 8/1995 | Lynch et al. | |
| 5,444,478 A | 8/1995 | Lelong et al. | |
| 5,467,271 A | 11/1995 | Abel et al. | |
| 5,467,288 A | 11/1995 | Fasciano et al. | |
| 5,473,379 A | 12/1995 | Horne | |
| 5,477,331 A | 12/1995 | Yamaguchi et al. | |
| 5,485,611 A | 1/1996 | Astle | |
| 5,486,852 A | 1/1996 | Arai et al. | |
| 5,488,409 A | 1/1996 | Yuen et al. | |
| 5,498,002 A | 3/1996 | Gechter | |
| 5,510,830 A | 4/1996 | Ohia et al. | |
| 5,514,861 A | 5/1996 | Swartz et al. | |
| 5,524,051 A | 6/1996 | Ryan | |
| 5,524,193 A | 6/1996 | Covington et al. | |
| 5,528,282 A | 6/1996 | Voeten et al. | |
| 5,535,382 A | 7/1996 | Ogawa | |
| 5,537,151 A | 7/1996 | Orr et al. | |
| 5,537,530 A | 7/1996 | Edgar et al. | |
| 5,539,483 A | 7/1996 | Nalwa | |
| 5,546,145 A | 8/1996 | Bernardi et al. | |
| 5,550,754 A | 8/1996 | McNelley et al. | |
| 5,553,221 A | 9/1996 | Reimer et al. | |
| 5,555,463 A | 9/1996 | Staron et al. | |
| 5,572,261 A | 11/1996 | Cooper | |
| 5,572,643 A | 11/1996 | Judson | |
| 5,575,443 A | 11/1996 | Honeycutt | |
| 5,583,560 A | 12/1996 | Florin et al. | |
| 5,583,565 A | 12/1996 | Cortjens et al. | |
| 5,583,571 A | 12/1996 | Friedland | |
| 5,583,652 A | 12/1996 | Ware | |
| 5,589,892 A | 12/1996 | Knee et al. | |
| 5,590,195 A | 12/1996 | Ryan | |
| 5,592,626 A | 1/1997 | Papadimitriou et al. | |
| 5,594,498 A | 1/1997 | Fraley | |
| 5,598,352 A | 1/1997 | Rosenau et al. | |
| 5,604,551 A | 2/1997 | Choi et al. | |
| 5,606,359 A | 2/1997 | Youden et al. | |
| 5,608,839 A | 3/1997 | Chen | |
| 5,612,742 A | 3/1997 | Krause et al. | |
| 5,613,032 A | 3/1997 | Cruz et al. | |
| 5,613,909 A | 3/1997 | Stelovsky | |
| 5,614,940 A | 3/1997 | Cobbley et al. | |
| 5,617,526 A | 4/1997 | Oran et al. | |
| 5,623,173 A | 4/1997 | Fasullo et al. | |
| 5,635,982 A | 6/1997 | Zhang et al. | |
| 5,664,227 A | 9/1997 | Mauldin et al. | |
| 5,666,159 A | 9/1997 | Parulski et al. | |
| 5,671,014 A | 9/1997 | Ito et al. | |
| 5,678,793 A | 10/1997 | Hill | |
| 5,682,597 A | 10/1997 | Ganek et al. | |
| 5,684,514 A | 11/1997 | Branscomb | |
| 5,687,095 A | 11/1997 | Haskell et al. | |
| 5,689,300 A | 11/1997 | Shibata et al. | |
| 5,689,648 A | 11/1997 | Diaz et al. | |
| 5,692,213 A | 11/1997 | Goldberg et al. | |
| 5,692,661 A | 12/1997 | Kellerman | |
| 5,694,474 A | 12/1997 | Ngo et al. | |
| 5,701,582 A | 12/1997 | DeBey et al. | |
| 5,703,655 A | 12/1997 | Corey et al. | |
| 5,703,795 A | 12/1997 | Mankovitz | |
| 5,713,021 A | 1/1998 | Kondo et al. | |
| 5,717,814 A | 2/1998 | Abecassis | |
| 5,717,869 A | 2/1998 | Moran et al. | |
| 5,721,823 A | 2/1998 | Chen et al. | |
| 5,724,424 A | 3/1998 | Gifford | |
| 5,724,567 A | 3/1998 | Rose et al. | |
| 5,724,646 A | 3/1998 | Ganek et al. | |
| 5,726,660 A | 3/1998 | Purdy et al. | |
| 5,726,717 A | 3/1998 | Peters et al. | |
| 5,729,108 A | 3/1998 | Steele | |

| | | | | | | |
|---|---|---|---|---|---|---|
| 5,729,741 A | 3/1998 | Liaguno et al. | 6,061,055 A | 5/2000 | Marks | |
| 5,737,009 A | 4/1998 | Payton | 6,061,056 A | 5/2000 | Menard et al. | |
| 5,740,037 A | 4/1998 | McCann et al. | 6,064,980 A | 5/2000 | Jacobi et al. | |
| 5,740,549 A | 4/1998 | Reilly et al. | 6,069,621 A | 5/2000 | Schupak | |
| 5,742,339 A | 4/1998 | Wakui et al. | 6,072,542 A | 6/2000 | Wilcox et al. | |
| 5,742,517 A | 4/1998 | Van Den Bosch | 6,078,740 A | 6/2000 | DeTreville | |
| 5,748,190 A | 5/1998 | Kjorsvik | 6,078,916 A | 6/2000 | Culliss | |
| 5,749,010 A | 5/1998 | McCumber | 6,081,551 A | 6/2000 | Etoh et al. | |
| 5,749,081 A | 5/1998 | Whiteis | 6,098,064 A | 8/2000 | Pirolli et al. | |
| 5,751,336 A | 5/1998 | Aggarwal et al. | 6,118,925 A | 9/2000 | Murata et al. | |
| 5,751,806 A | 5/1998 | Ryan | 6,141,693 A | 10/2000 | Perlman et al. | |
| 5,752,113 A | 5/1998 | Borden | 6,160,950 A | 12/2000 | Shimazaki et al. | |
| 5,754,230 A | 5/1998 | Tsuruta et al. | 6,172,675 B1 | 1/2001 | Ahmad et al. | |
| 5,754,938 A | 5/1998 | Herz et al. | 6,182,067 B1 | 1/2001 | Presnell et al. | |
| 5,754,939 A | 5/1998 | Herz et al. | 6,195,657 B1 | 2/2001 | Rucker et al. | |
| 5,758,181 A | 5/1998 | Becker | 6,199,080 B1 | 3/2001 | Nielsen | |
| 5,765,133 A | 6/1998 | Antoniol et al. | 6,208,989 B1 | 3/2001 | Dockter et al. | |
| 5,768,528 A | 6/1998 | Stumm | 6,212,657 B1 | 4/2001 | Wang et al. | |
| 5,768,640 A | 6/1998 | Takahashi et al. | 6,236,395 B1 | 5/2001 | Sezan et al. | |
| 5,768,648 A | 6/1998 | Skipp et al. | 6,243,725 B1 | 6/2001 | Hempleman et al. | |
| 5,774,498 A | 6/1998 | Oya et al. | 6,259,817 B1 | 7/2001 | Ahmad | |
| 5,774,664 A | 6/1998 | Hidary et al. | 6,263,507 B1 * | 7/2001 | Ahmad et al. | 725/134 |
| 5,778,181 A | 7/1998 | Hidary et al. | 6,266,085 B1 | 7/2001 | Kato | |
| 5,781,894 A | 7/1998 | Petrecca et al. | 6,266,649 B1 | 7/2001 | Linden et al. | |
| 5,791,907 A | 8/1998 | Ramshaw et al. | 6,272,231 B1 | 8/2001 | Maurer et al. | |
| 5,793,367 A | 8/1998 | Taguchi et al. | 6,282,362 B1 | 8/2001 | Murphy et al. | |
| 5,793,971 A | 8/1998 | Fujita et al. | 6,297,845 B1 | 10/2001 | Kuhn et al. | |
| 5,796,426 A | 8/1998 | Gullichsen et al. | 6,351,599 B1 | 2/2002 | Komeno et al. | |
| 5,796,945 A | 8/1998 | Tarabella | 6,360,202 B1 | 3/2002 | Bhadkamkar et al. | |
| 5,796,967 A | 8/1998 | Filepp et al. | 6,360,234 B2 | 3/2002 | Jain et al. | |
| 5,805,156 A | 9/1998 | Richmond et al. | 6,360,261 B1 | 3/2002 | Boyd et al. | |
| 5,809,161 A | 9/1998 | Auty et al. | 6,366,296 B1 | 4/2002 | Boreczky et al. | |
| 5,818,439 A | 10/1998 | Nagasaka et al. | 6,377,519 B1 | 4/2002 | Lee et al. | |
| 5,818,510 A | 10/1998 | Cobbley et al. | 6,385,386 B1 | 5/2002 | Aotake et al. | |
| 5,819,284 A | 10/1998 | Farber et al. | 6,385,619 B1 | 5/2002 | Eichstaedt et al. | |
| 5,822,493 A | 10/1998 | Uehara et al. | 6,404,811 B1 | 6/2002 | Cvetko et al. | |
| 5,826,206 A | 10/1998 | Nemeth | 6,434,621 B1 | 8/2002 | Pezzillo et al. | |
| 5,828,994 A | 10/1998 | Covell et al. | 6,452,969 B1 | 9/2002 | Yim | |
| 5,831,662 A | 11/1998 | Payton | 6,460,036 B1 | 10/2002 | Herz | |
| 5,835,667 A | 11/1998 | Wactlar et al. | 6,466,918 B1 | 10/2002 | Spiegel et al. | |
| 5,844,693 A | 12/1998 | Miyata et al. | 6,496,568 B1 * | 12/2002 | Nelson | 379/88.12 |
| 5,850,520 A | 12/1998 | Griebenow et al. | 6,502,139 B1 | 12/2002 | Birk et al. | |
| 5,864,871 A | 1/1999 | Kitain et al. | 6,556,989 B1 | 4/2003 | Naimark et al. | |
| 5,870,143 A | 2/1999 | Suzuki et al. | 6,563,532 B1 | 5/2003 | Strub et al. | |
| 5,870,754 A | 2/1999 | Dimitrova et al. | 6,574,630 B1 * | 6/2003 | Augustine et al. | 1/1 |
| 5,870,770 A | 2/1999 | Wolfe | 6,591,245 B1 | 7/2003 | Klug | |
| 5,873,076 A | 2/1999 | Barr et al. | 6,594,682 B2 * | 7/2003 | Peterson et al. | 718/102 |
| 5,880,788 A | 3/1999 | Bregler | 6,596,030 B2 | 7/2003 | Ball et al. | |
| 5,884,141 A | 3/1999 | Inoue et al. | 6,622,305 B1 | 9/2003 | Willard | |
| 5,886,739 A | 3/1999 | Winningstad | 6,624,846 B1 | 9/2003 | Lassiter | |
| 5,892,536 A | 4/1999 | Logan et al. | 6,633,910 B1 | 10/2003 | Rajan et al. | |
| 5,892,909 A | 4/1999 | Grasso et al. | 6,681,369 B2 | 1/2004 | Meunier et al. | |
| 5,893,062 A | 4/1999 | Bhadkamkar et al. | 6,690,273 B2 | 2/2004 | Thomason | |
| 5,893,091 A | 4/1999 | Hunt et al. | 6,691,106 B1 | 2/2004 | Sathyanarayan | |
| 5,907,322 A | 5/1999 | Kelly et al. | 6,701,528 B1 | 3/2004 | Arsenault et al. | |
| 5,913,040 A | 6/1999 | Rakavy et al. | 6,704,750 B2 | 3/2004 | Asazu et al. | |
| 5,917,542 A | 6/1999 | Moghadam et al. | 6,721,744 B1 | 4/2004 | Naimark et al. | |
| 5,926,205 A | 7/1999 | Krause et al. | 6,728,678 B2 | 4/2004 | Bhadkamkar et al. | |
| 5,929,904 A | 7/1999 | Uchida et al. | 6,748,455 B1 * | 6/2004 | Hinson et al. | 719/318 |
| 5,936,659 A | 8/1999 | Viswanathan et al. | 6,750,880 B2 | 6/2004 | Freiberger et al. | |
| 5,940,004 A | 8/1999 | Fulton | 6,757,682 B1 * | 6/2004 | Naimark et al. | 709/217 |
| 5,946,050 A | 8/1999 | Wolff | 6,757,866 B1 | 6/2004 | Dey et al. | |
| 5,959,623 A | 9/1999 | van Hoff et al. | 6,782,186 B1 | 8/2004 | Covell et al. | |
| 5,963,916 A | 10/1999 | Kaplan | 6,788,314 B1 * | 9/2004 | Freiberger et al. | 715/730 |
| 5,968,175 A | 10/1999 | Morishita et al. | 6,803,945 B1 | 10/2004 | Needham | |
| 5,974,235 A | 10/1999 | Nunally et al. | 6,804,675 B1 | 10/2004 | Knight et al. | |
| 5,978,828 A | 11/1999 | Greer et al. | 6,807,558 B1 * | 10/2004 | Hassett et al. | 709/203 |
| 5,982,979 A | 11/1999 | Omata et al. | 6,825,875 B1 | 11/2004 | Strub et al. | |
| 5,999,173 A | 12/1999 | Ubillos | 6,868,452 B1 | 3/2005 | Eager et al. | |
| 6,005,564 A | 12/1999 | Ahmad et al. | 6,880,171 B1 | 4/2005 | Ahmad et al. | |
| 6,009,204 A | 12/1999 | Ahmad | 6,901,209 B1 | 5/2005 | Cooper et al. | |
| 6,018,359 A | 1/2000 | Kermode et al. | 6,934,461 B1 | 8/2005 | Strub et al. | |
| 6,020,883 A | 2/2000 | Herz et al. | 6,961,954 B1 | 11/2005 | Maybury et al. | |
| 6,020,884 A | 2/2000 | MacNaughton et al. | 6,963,867 B2 | 11/2005 | Ford et al. | |
| 6,025,837 A | 2/2000 | Matthews, III et al. | 6,986,156 B1 | 1/2006 | Rodriguez et al. | |
| 6,034,652 A * | 3/2000 | Freiberger et al. ............ 715/730 | 6,993,787 B1 | 1/2006 | Kamel et al. | |
| 6,035,336 A | 3/2000 | Lu et al. | 7,062,484 B2 | 6/2006 | Pass | |
| 6,041,142 A | 3/2000 | Rao et al. | 7,072,575 B2 | 7/2006 | Kang et al. | |
| 6,049,777 A | 4/2000 | Sheena et al. | 7,082,407 B1 | 7/2006 | Bezos et al. | |

| | | | |
|---|---|---|---|
| 7,130,528 B2 | 10/2006 | Blair et al. | |
| 7,143,431 B1 | 11/2006 | Eager et al. | |
| 7,155,735 B1 | 12/2006 | Ngo et al. | |
| 7,181,417 B1 | 2/2007 | Langseth | |
| 7,194,186 B1 | 3/2007 | Strub et al. | |
| 7,209,942 B1* | 4/2007 | Hori et al. | 709/203 |
| 7,266,771 B1 | 9/2007 | Tow et al. | |
| 7,310,615 B2 | 12/2007 | Lewis | |
| 7,340,760 B2 | 3/2008 | Wachtfogel et al. | |
| 7,348,935 B1 | 3/2008 | Freiberger et al. | |
| 7,519,271 B2 | 4/2009 | Strub et al. | |
| 7,565,681 B2 | 7/2009 | Ngo et al. | |
| 7,849,475 B2 | 12/2010 | Covell et al. | |
| 2002/0006266 A1 | 1/2002 | Yoon et al. | |
| 2002/0013949 A1 | 1/2002 | Hejna | |
| 2002/0031331 A1 | 3/2002 | Kwoh et al. | |
| 2002/0073105 A1 | 6/2002 | Noguchi et al. | |
| 2002/0120925 A1 | 8/2002 | Logan | |
| 2002/0157103 A1 | 10/2002 | Song et al. | |
| 2002/0159750 A1 | 10/2002 | Jasinschi et al. | |
| 2002/0170068 A1 | 11/2002 | Rafey et al. | |
| 2003/0014326 A1 | 1/2003 | Ben-Meir et al. | |
| 2003/0043194 A1 | 3/2003 | Lif | |
| 2003/0093790 A1 | 5/2003 | Logan et al. | |
| 2003/0149574 A1 | 8/2003 | Rudman | |
| 2003/0163824 A1 | 8/2003 | Gordon et al. | |
| 2004/0022313 A1 | 2/2004 | Kim | |
| 2004/0078812 A1 | 4/2004 | Calvert | |
| 2004/0123324 A1 | 6/2004 | Sazzad et al. | |
| 2004/0162772 A1 | 8/2004 | Lewis | |
| 2004/0170385 A1 | 9/2004 | Bhadkamkar | |
| 2004/0210555 A1* | 10/2004 | Naimark et al. | 707/1 |
| 2005/0055306 A1 | 3/2005 | Miller et al. | |
| 2005/0183127 A1 | 8/2005 | Ngo et al. | |
| 2006/0031879 A1 | 2/2006 | Colter | |
| 2006/0031885 A1 | 2/2006 | Colter | |
| 2006/0031916 A1 | 2/2006 | Colter | |
| 2006/0053470 A1 | 3/2006 | Colter et al. | |
| 2008/0127240 A1 | 5/2008 | Covell et al. | |
| 2009/0097823 A1 | 4/2009 | Bhadkamkar et al. | |
| 2009/0276817 A1 | 11/2009 | Colter et al. | |
| 2011/0055861 A1 | 3/2011 | Covell et al. | |

FOREIGN PATENT DOCUMENTS

| | | |
|---|---|---|
| EP | 513601 | 11/1992 |
| EP | 674315 | 9/1995 |
| EP | 689362 | 12/1995 |
| GB | 2231246 | 11/1990 |
| JP | 1174192 | 7/1989 |
| JP | 2054331 | 2/1990 |
| JP | 4051628 | 2/1992 |
| JP | 4061628 | 2/1992 |
| JP | 5284437 A | 10/1993 |
| JP | 6162166 | 6/1994 |
| JP | 07114572 | 5/1995 |
| JP | 7507169 T2 | 8/1995 |
| JP | 7295531 A | 11/1995 |
| JP | 7319691 A | 12/1995 |
| JP | 08106543 | 4/1996 |
| JP | 9269923 | 10/1997 |
| WO | 8902628 | 3/1989 |
| WO | 9319427 | 9/1993 |
| WO | 9430000 | 12/1994 |
| WO | 9515801 | 6/1995 |
| WO | 9612240 | 4/1996 |
| WO | 9627983 | 9/1996 |
| WO | 9630864 | 10/1996 |
| WO | 9715926 | 5/1997 |
| WO | 9735296 | 9/1997 |
| WO | 9827497 | 6/1998 |

OTHER PUBLICATIONS

"About Upoc," http://www.upoc.com/about.jsp, Feb. 7, 2001, 1 page.

Douglis et al., "Rate of Change and other Metrics: a Live Study of the World Wide Web," USENIX symposium on Internet Technologies and Systems, Dec. 1997, 14 pages, Monterey, CA.

eNow-Company Background, http://www.enow.com/html/compl.html, Feb. 7, 2001, 2 pages.

Guernsey, L., "Mining the 'Deep Web' with Specialized Drills," Jan. 25, 2001, The New York Times, 3 pages.

Hollands, P., "Keeping Track of Changes to Web-based Resources," eLib, URL-Minder, May 20, 1996, 8 pages.

Schwab et al., "Learning to Recommend From Positive Evidence," pp. 241-247.

Sodergard et al., "Integrated Multimedia Publishing-Combining TV and Newspaper Content on Personal Channels," W8-papers, Jun. 18, 1999, http://www8.org/w8-papers/1b-multimedia/integrated/integrated.html, 24 pages [accessed on Jan. 23, 2007].

"Welcome to MyZDnet Alerts," http://my.zdnet.com/alerthelp, Sep. 25, 2000, 1 page.

Widyantoro, Ioerget, Yen, "An Adaptive Algorithm for Learning Changes in User Interests," Department of Computer Sciences, Texas A&M University, pp. 405-412.

"Worldwide Webcam," http://www.worldwide-top100.com/topsites1/, Sep. 25, 2000, 4 pages.

PCT International Search Report for corresponding International Application PCT/US97/04610 (WO 1997/035296), 3 pages.

Rigdon, Joan E., "Screen Savers Go Beyond Fish, Flying Toasters," Wall Street Journal, Feb. 13, 1996, 1 page.

Gomes, Lee, "Upstart's Internet 'TV' has Microsoft Tuned in," Wall Street Journal, Jul. 29, 1996,1 page.

Staff Reporter, "PointCast Inc. is Testing New Screen-Saver Product," Wall Street Journal, May 1996, 1 page.

Fujikawa, "Subrogation of User Account by Advertisement," Nikei Communications, Mar. 4, 1996, No. 217.

Tokuda, "To make the Internet Free—Mr. Y. Itakera (President, Hyper Net)," Nikkei Business Publications, Mar. 11, 1996, No. 831.

Paris et al., "A Low Bandwidth Broadcasting Protocol for Video on Demand," IC3N '98, Oct. 1998, pp. 640-647.

Elliott, E., "Multiple Views of Digital Video," MIT Media Laboratory, Interactive Cinema Group, Mar. 23, 1992, 4 pages.

Elliott, E., "Watch, Grab, Arrange, See: Thinking with Motion Images via Streams and Collages," Masters Thesis, School of Architecture and Planning, Massachusetts Institute of Technology, Feb. 1993, 105 pages.

CNN At Work White Paper, 1994, 22 pages.

Salton et al., "Improving Retrieval Performance by Relevance Feedback," Journal of the American Society for Information Science, vol. 41, No. 4, Jun. 1990, pp. 288-297.

Shibata M., "A Description Model of Video Content and Its Application for Video Structuring," Systems and Computers in Japan, vol. 27, No. 7, Jun. 1996, pp. 70-83.

Yeung, M. M. et al., "Efficient Matching and Clustering of Video Shots," IEEE '95 (ICIP), vol. 1, Oct. 1995, pp. 338-341.

Wactlar et al., "Intelligent Access to Digital Video: Informedia Project," Computer, vol. 29, No. 5, May 1996, pp. 46-52.

Sakauchi et al., "Multimedia Database Systems for the Contents Mediator," IEICE Trans. Inf. and Syst., vol. E79-D, No. 6, Jun. 1996, pp. 641-646.

Shahraray et al., "Automatic generation of pictoral transcripts of video programs," SPIE, vol. 2417, Jan. 1995, pp. 512-518.

Lindblad et al., "ViewStation Applications: Implications for Network Traffic," IEEE Journal on Selected Areas in Communications, vol. 13, No. 5, Jun. 1995, pp. 768-777, New York, NY, US.

Horner, C., "NewsTime: A Graphical User Interface to Audio News," Masters Thesis, School of Architecture and Planning, Massachusetts Institute of Technology, Jun. 1993, pp. 1-84.

Hauptmann et al., "Text, Speech, and Vision for Video Segmentation: The Informedia Project," AAAI Fall Symposium, Computational Models for Integrating Language and Vision, Nov. 10-12, 1995, 12 pages.

Tennenhouse et al., "The ViewStation: a software-intensive approach to media processing and distribution," Proceedings of the 17th Annual Conference on Research and Development in Information Retrieval, Jul. 3-6, 1994, pp. 104-115.

Zhang et al., "Automatic Parsing of News Video," IEEE Conference on Multimedia Computing and Systems, 1994, pp. 45-54.

Scheirer et al., "Construction and Evaluation of a Robust Multifeature Speech/Music Discriminator," Proc. ICASSP, Apr. 21-24, 1997, pp. 1-4.

Buckley et al., "The Effect of Adding Relevance Information in a Relevance Feedback Environment," Proceedings of the 17th Annual Conference on Research and Development in Information Retrieval, Jul. 3-6, 1994, pp. 292-300.

Roucos et al., "High Quality Time-Scale Modification for Speech," Proceedings of the International Conference on Acoustics, Speech, and Signal Processing, IEEE, 1985, pp. 493-496.

Reynolds, D., "A Gaussian Mixture Modeling Approach to Text-Independent Speaker Identification," PhD. Thesis, Dept. of Electrical Engineering, Georgia Institute of Technology, Aug. 1992, pp. 1-154.

"Correlating Audio and Moving-Image Tracks," IBM Technical Disclosure Bulletin, vol. 33, No. 10A, Mar. 1991, pp. 295-296.

"Evolution of Steve Mann's 'existential computer'," 'Personal Imaging', IEEE Computer Society, http://computer.org/pubs/computer/19971029710c.htm, 1997, 1 page.

"Informedia: Experience on Demand," DARPA/ITO Joint IC and V/IM Principal Investigator Meeting, Oct. 15-17, 1997, 2 pages.

VideoLogger® SDK: Virage Open Architecture, Datasheet, Virage, Inc., San Mateo, California, 2003, 2 pages.

VideoLogger®: Automate Video Encoding and Indexing, Datasheet, Virage, Inc., San Mateo, California, 2003, 3 pages.

Arons, B., "Techniques, Perception, and Applications of Time-Compressed Speech," Proceedings of 1992 Conference American Voice 110 Society, Sep. 1992, 19 pages.

Brooke et al., "Computer Graphics Animations of Talking Faces Based on Stochastic Models," ISSIPNN '94, 1994 International Symposium on Speech, Image Processing and Neural Networks, Proceedings, vol. 1, Apr. 1994, pp. 73-76.

Carter, S. et al., "Improving Video-on Demand Server Efficiency Through Stream Tapping," 1997 IEEE, pp. 200-207.

Carter, S. et al., "Video-on-Demand Broadcasting Protocols," pp. 1-25.

Chen F. et al., "The Use of Emphasis to Automatically Summarize a Spoken Discourse," 1992 IEEE International Conference on Acoustics, Speech and Signal Processing, Mar. 23-26, 1992, pp. 1-229 and 1-232.

Chen, T. et al, "Lip synchronization in talking head video utilizing speech information," SPIE, Visual Communications and Image Processing '95, vol. 2501, Jul. 1995, pp. 1690-1701.

Covell et al "Spanning the Gap between Motion Estimation and Morphing," Proceedings of the IEEE International Conference on Acoustics, Speech and Signal Processing, Apr. 19-22, 1994, Adelaide, Australia, http://www.mangolassi.org/covell/1994-0101, 8 pages [Internet Accessed on Jul. 11, 2008].

Virtual Tech, "Thousands of NEW Products are introduced every year by hundreds of companies . . . ," Toyoda MachineJY USA, believed to be in use in Japan in 1998, 2 pages.

Flanagan et al., "Computer-steered microphone arrays for sound transduction in large rooms," J. Acoust. Soc. Am. 78 (5), Nov. 1985, pp. 1508-1518.

Forsyth, David et al., "Searching for Digital Pictures," Scientific American, Jun. 1997, pp. 88-93.

Froba, Bernhard et al., "Multi-Sensor Biometric Person Recognition in an Access Control System," Proceedings Second International Conference on Audio- and Video-Based Biometric Person Authentication, Mar. 22-23, 1999, Washington, D.C., pp. 55-59.

Frost III, Otis, "An Algorithm for Linearly Constrained Adaptive Array Processing," Proceedings of the IEEE, vol. 60, No. 8, Aug. 1972, pp. 926-935.

Gemperle, Francine et al., "Design for Wearability," IEEE, 1998, pp. 116-122.

Grenier, Yves, "A microphone array for car environments," Speech Communication, vol. 12, No. 1, Mar. 1993, pp. 25-39.

Haeberli, Paul et al., "Automatic Panoramic Image Merging," World Wide Web, Grafica Obscura, 1998, 2 pages.

Hall, Allan, "A new spin on power dressing," Associated Newspapers Ltd., Sep. 14, 1999, 1 page.

Hauptmann et al., "Speech for Multimedia Information Retrieval," UIST '95 (ACM), Nov. 14, 1995, pp. 79-80.

Healey, Jennifer et al., "Quantifying Driver Stress: Developing a System for Collecting and Processing Bio-Metric Signals in Natural Situations," Proceedings of the Rocky Mountain Bio-Engineering Symposium, Apr. 16-18, 1999, pp. 1-6.

Healey, Jennifer et al., "StartleCam: A Cybernetic Wearable Camera," Second International Symposium on Wearable Computers, Oct. 19-20, 1998, pp. 42-49.

Henton, C. et ai, "Saying and Seeing It With Feeling: Techniques for Synthesizing Visible, Emotional Speech," SSW2-1994, pp. 73-76.

Huttenlocher et al., "Tracking Non-Rigid Objects in Complex Scenes," IEEE International Conference on Computer Vision, 1993, pp. 93-101.

Kelly, Patrick H. et al., "An Architecture for Multiple Perspective Interactive Video," Multimedia 1995, pp. 201-212.

Mann, S. et al., Video Orbits of the Projective Group: A simple approach to featureless estimation of parameters, IEEE Trans., Image Proc., Jul. 1997, pp. 1-31.

Mann, S. et al., Virtual Bellows: Constructing High Quality Stills from Video, IEEE, 1994, pp. 363-367.

Moulines et al., "Non-parametric techniques for pitch-scale and time-scale modification of speech," Speech Communication, vol. 16, 1995, pp. 175-205.

Phillips, P. Jonathon et al., "The FERET Evaluation," Face Recognition: From Theory to Applications 1998, pp. 244-261.

Product description for SMPTE Time Code Products for GPS Video Position Logging, Horita Co., Inc., Viejo, CA, 1998, 1 page.

Product description for Studio Master Time Code and Sync Generators, Horita Co., Inc., Viejo, California, 1998, 1~e.

Rabiner, A Tutorial on Hidden Markov Models and Selected Applications in Speech Recognition, Proceedings of the IEEE, vol. 77, No. 2, Feb. 1989, pp. 257-285.

Rosenberg, Aaron et al., "Recent Research in Automatic Speaker Recognition," Advances in Speech Signal Processing, 1992, pp. 701-738.

Scott et al, "Synthesis of Speaker Facial Movement to Match Selected Speech Sequences," Speech Science and Technology '94, Dec. 5-8, Perth, Australia, 6 pages.

Senior, Andrew, "Face and feature finding for a face recognition system," Proceedings Second International Conference on Audio- and Video-based Biometric Person Authentication, Mar. 22-23, 1999, Washington, D.C., pp. 154-159.

Slaney, M. et al., "Baby Ears: A Recognition System for Affective Vocalizations," Proceeding of the 1998 International Conference on Acoustics, Speech, and Signal Processing (ICASSP), Seattle, WA, May 12-15, 1998, 4 pages.

Sony ClipLink Guide, 1996, pp. 9-14.

Sony PowerHAD digital camcorder operating instructions, 1998, pp. 65-71.

Szeliski, R. et al., "Creating Full View Panoramic Image Mosaics and Environment Maps," Computer Graphics Proceedings, Annual Conference Series, 1997, pp. 251-258.

Szeliski, Richard, Video Mosaics for Virtual Environments, IEEE Computer Graphics and Application, Mar. 1996, pp. 22-30.

Welsh et al., "Facial-Feature Image Coding Using Principal Components," Electronics Letters, vol. 28, No. 22, Oct. 1992, pp. 2066-2067.

Supercircuits Microvideo Catalog, GC1 Professional Grade Color Covert Glasses Cam, 1998, 1 page.

La Lunette Camera—Alain Mikli, http://www.mikli.fr/eng/Actualites/LcameralLcamera.htm?Nav=1, La Lunette Camera Sunglasses, Jul. 27, 1998, 1 page.

"About Gitzo," http/lwww.gitzo.com/en/company.htm, Gitzo SA Ball Head Camera Mounts, 1996 and 1997, 4 pages.

"Covert Video/Audio Sunglasses," From Rock House Products, http://www.rock2000.com/nanny/glasses.htm, 1219198, 2 pages.

Velbon.com, "CX Series Photo Tripods," and "OF-Series 'Dual Function' PhotoNideo Tripods," 3 pages [Internet accessed on Apr. 13, 1999].

1998 Everest Expedition: Technology, http://www.everest.org/EveresUtech.html, Datacam Technology, Jul. 31, 1998, 2 pages.

Zabih et al., "A Real-Time System for Automatically Annotating Unstructured Image Sequences," IEEE International Conference on Systems, Man, and Cybernetics, 1993, 6 pages.

Search Report PCT/US97/22145 (WO1998027497), Apr. 29, 1998.

Novell GroupWise Reference for Mcintosh Version 4.1, Novell, Inc. (1993, 1994), 210 pages.

Lichty, Tom, "The Official America Online for Windows Tour Guide" (2nd Edition) Version 2.5, Ventana Press, 1994, 54 pages.

DellaFera, Anthony C. et al, "The Zephyr Notification Service," Proceedings of Winter 1988 Usenix Technical Conference, 1988, 9 pages.

Brown, Martin G. et al., "Automatic Content-Based Retrieval of Broadcast News," Proceedings of the third ACM international conference on Multimedia, Association for Computing Machinery (ACM) 1995, 29 pages.

Masand, Brij et al., "Classifying News Stories using Memory Based Reasoning," SIGIR '92 Proceedings of the 15th Annual International ACM SIGIR Conference on Research and Development in Information Retrieval, Association for Computing Machinery (ACM) 1992, 7 pages.

Iwayama, Makoto et al., "Cluster-Based Text Categorization: A Comparison of Category Search Strategies," SIGIR '95: Proceedings of the 18th annual international ACM SIGIR Conference on Research and Development in Information retrieval, Association for Computing Machinery (ACM) 1995, 8 pages.

Nielsen, Jakob, "Hypertext & Hypermedia," Academic Press, Inc. 1990, 276 pages.

Clouthier, Ron et al., "Imaging Applications in the Work World," SPSE's International Symposium and Exposition on Electronic Imaging Devices and Systems '88, The International Society for Optical Engineering (SPIE) 1988, 10 pages.

Salton, Gerard et al., "Improving Retrieval Performance by Relevance Feedback," Journal of the American Society for Information Science, John Wiley & Sons, Inc. 1990, 10 pages.

Hjetsvold, Rune et al., "Integrated, Video Archive Tools," Multimedia '95: Proceedings of the Third ACM International Conference on Multimedia, Association for Computing Machinery (ACM) 1995, 11 pages.

Drummond, Chris, et al. "Intelligent Browsing for Multimedia Applications," Proceedings of the Third IEEE International Conference on Multimedia Computing and Systems 1996, IEEE 1996, 4 pages.

Salton, Gerard et al., "Introduction to Modern Information Retrieval," McGraw-Hill Book Company 1983, pp. 120-134, 137-145, 151-152, 236-244, and 424.

Cavnar, William B et al., "N-Gram-Based Text Categorization," Proceedings of SDAIR 94, 3rd Annual Symposium on Document Analysis and Information Retrieval, Information Science Research Institute (ISRI) 1994, 14 pages.

Pentland A. et al., "Photobook: Content-Based Manipulation of Image Databases," International Journal of Computer Vision, vol. 18, No. 3, pp. 233-254, Kluwer Academic Publishers 1996, 22 pages.

Pentland A. et al., "Photobook: Content-Based Manipulation of Image Databases," Proceedings of The Society of Photo-Optical Instrumentation Engineers (SPIE), 2185, 34, SPIE 1994, 24 pages.

Buckley, Chris et al., "The Effect of Adding Relevance Information Relevance Feedback Environment," SIGIR '94 Proceedings of the 17th annual international ACM SIGIR conference on Research and development in information retrieval, Association for Computing Machinery (ACM) 1994, 9 pages.

Chesnais, Pascal R. et al, "The Fishwrap Personalized News System," Proceedings of the Second International Workshop on Community Networking 1995: Integrated Multimedia Services to the Home, IEEE 1995, 8 pages.

Kindermann, C. et al., "The MIHMA Demonstrator Application: bmt line," Technical Report, Non Standard Logics S.A. and TU Berlin 1996, 39 pages.

Joachims, Thorsten et al., "WebWatcher: Machine Learning and Hypertext," Fachgruppentreffen Maschinelles Lernen, 1995, 7 pages.

Greening, Dan R., "Building Consumer Trust with Accurate Product Recommendations," A White Paper on LikeMinds WebSell 2.1, LikeMinds, Inc. 1997, 15 pages.

Glance, Natalie et al., "Knowledge Pump: Community-Centered Collaborative Filtering," Proceedings of the DELOS Workshop on Collaborative Filtering, 1997, 5 pages.

Glance, Natalie et al., "Making Recommender Systems Work for Organizations," Proceedings of PAAM'99, London, UK, Apr. 19-21, 1999, 21 pages.

MicroStrategy Launches Strategy.com, the World's First Personal Intelligence Network, Jun. 28, 1999.

Rucker, James et al. "Personalized Navigation for the Web," Communications of the ACM, vol. 40 Issue 3, Mar. 1997, 3 pages.

Nesbitt, Steve, "WebCobra: An Automated Collaborative Filtering Agent System for the World Wide Web," Degree Thesis, The Department of Computer Science at James Cook University of North Queensland, 1997, 114 pages.

Terlaga, Amy, "The URL Minder," Conntech 1995 Archives, Jul. 29, 1995, 2 pages.

* cited by examiner

| Alert_id | ~ 502 |
| Timestamp | ~ 504 |
| Alerter_id | ~ 506 |
| URL | ~ 508 |
| Interest selection | ~ 510 |
| Caption | ~ 512 |
| Alert intensity | ~ 514 |
| Last_time | ~ 516 |
| Last_rank | ~ 518 |
| Last_weight | ~ 520 |
| Last_intensity_sum | ~ 522 |
| Last_normal_time | ~ 524 |

*FIG. 5*

ALERTING USERS TO ITEMS OF CURRENT INTEREST

CROSS-REFERENCE TO RELATED APPLICATION(S)

This application is a continuation of U.S. patent application Ser. No. 10/800,393 entitled "Alerting Users To Items Of Current Interest" filed Mar. 12, 2004 now abandoned, which is a continuation of U.S. patent application Ser. No. 09/656,638 entitled "Alerting Users To Items Of Current Interest" filed Sep. 7, 2000 (now U.S. Pat. No. 6,757,682) which claims the benefit of U.S. Provisional Patent Application No. 60/178,627 entitled "Alerting Users To Web Sites Of Current Interest And Handling Large Increases In User Traffic" filed Jan. 28, 2000, all of which are incorporated herein by reference for all purposes.

This application is related to U.S. patent application Ser. No. 09/656,518 entitled "Quantifying The Level Of Interest Of An Item Of Current Interest" filed Sep. 7, 2000 (now U.S. Pat. No. 6,556,989), which is incorporated herein by reference for all purposes; and U.S. patent application Ser. No. 09/658,346 entitled "Normalizing A Measure Of The Level Of Current Interest Of An Item Accessible Via A Network" filed Sep. 7, 2000 (now U.S. Pat. No. 6,721,744), which is incorporated herein by reference for all purposes.

TECHNICAL FIELD

The present invention relates generally to communications and computer networks. More specifically, alerting users to dynamic content accessible via a communications or computer network that is of interest at the time of the alert is disclosed.

BACKGROUND

The use of the Internet, and in particular the World Wide Web, and other communication and computer networks has grown dramatically in recent years. The emergence of technologies for broader bandwidth communications, better compression technology, and new and less expensive digital recording and imaging technology, have all contributed to explosive growth in the volume and diversity of content available via communication and/or computer networks, such as the World Wide Web.

However, this proliferation of content, such as audio, image, and video content, presents certain challenges from the perspective of users seeking content of current interest. First, the shear volume of content available makes it difficult for users to find the content in which they are most interested in accessing at any given time. Apart from having to sort through the enormous volume of content available, much of the content of potentially greatest interest, at least to many users, is dynamic. At certain times, a file or other electronic resource may be of great interest while at other times, or perhaps even most of the time, it is not of great interest or not interesting at all.

For example, thousands of and perhaps in excess of a hundred thousand web cameras, or "webcams", are in use. Webcams are cameras used to provide images of a target of interest via a site on the World Wide Web. Images are updated in varying manners and at varying intervals, depending on the site. A webcam might be used, for example, to provide images of a watering hole in Africa. Typically, users would access a website associated with the webcam to view activity at the watering hole. However, there would be many periods during which nothing of particular interest (e.g., no animals, etc.) would be happening at the watering hole. Conversely, there would be occasional periods when activity of great interest would be occurring, such as the presence of a rare or endangered animal at the watering hole. Users would have no way of knowing when such activity would be occurring and might miss the most interesting images if they did not happen to check the website at the right time. The same problems arise with respect to files or other electronic resources other than webcam content provided via the World Wide Web, including other media such as audio.

As a result, there is a need for a way to alert users to web content or other electronic resources available via a communications or computer network that are of interest at a particular time. To meet this latter need, there is a need to provide a way to become aware that dynamic web content or an electronic resource other than web content is of interest at a given time, and to quantify the degree or level of current interest. In addition, there is a need to consider the interests of a user when determining which web content or other electronic resources likely will be of the greatest interest to the user.

There is also a need to ensure that interested users receive alerts with respect to web content or other electronic resources that are of interest only to a relatively small community of users, or that are of interest on only relatively rare or infrequent occasions. There is a risk, otherwise, that indications of current interest regarding such files and other electronic resources would be masked by more voluminous or frequent activity with respect to more widely popular or pervasive resources or types of resources (such as pornography sites on the World Wide Web).

SUMMARY

Accordingly, alerting users of items of current interest is disclosed. The level of current interest of a particular file or other electronic resource is determined based on indications received from alerting users. One or more users receive an alert that the item is of current interest. Normalization of the level of current interest of a file or other resource, such as to adjust for items of current interest to a small community or for items of current interest only infrequently, also is described.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

Disseminating to a participant an indication that an item accessible by the participant via a network is of current interest is disclosed. In one embodiment, an indication that the item is of current interest is received in real time. The indication is processed. The participant is informed that the item is of current interest.

In one embodiment, a computer is configured to receive in real time an indication that an item is of current interest; process the indication; and inform a participant that the item is of current interest. A database, associated with the computer, is configured to store data relating to the item.

In one embodiment, a computer program product for disseminating to a participant an indication that an item accessible by the participant via a network is of current interest comprises computer instructions for receiving in real time an indication that the item is of current interest; processing the indication; and informing the participant that the item is of current interest.

These and other features and advantages of the present invention will be presented in more detail in the following detailed description and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 5 is an illustration of the data structure used in one embodiment for the alert object.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
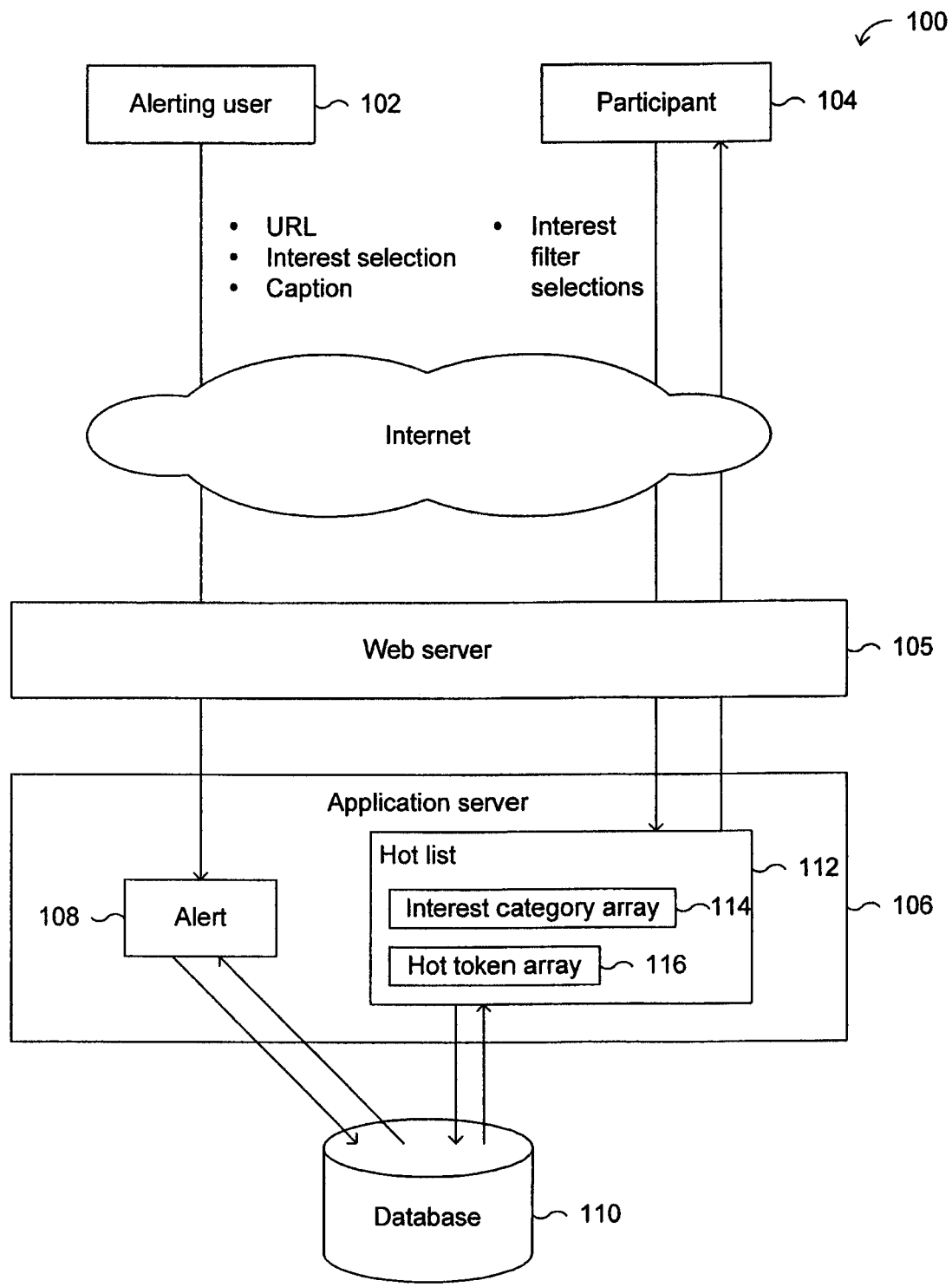
FIG. 1 is a schematic diagram illustrating a system used in one embodiment to alert users to dynamic content of interest at the time of the alert (also referred to herein as an "item of current interest").

FIG. 1 is a schematic diagram illustrating a system used in one embodiment to alert users to dynamic content of interest at the time of the alert (also referred to herein as an "item of current interest"). The system 100 includes at least one alerting user 102 who accesses dynamic content associated with a uniform resource locator (URL), determines the content is of current interest, and sends an alert indicating that the URL is of current interest, as described more fully below. The system 100 also includes at least one participant 104. In one embodiment, participant 104 provides an indication of the participant's interests and receives a list of URLs providing the location of dynamic content, such as web content on the World Wide Web, that may be of interest to the participant at the time of the alert, as described more fully below. Both the alerting user 102 and the participant 104 are connected to a web server 105 via the Internet. Web server 105 is a computer system configured to present web pages and other web browser readable files, and to receive data from users, via the World Wide Web. Web server 105 is connected to an application server 106 and is configured to provide data to and receive data and instructions from application server 106. Application server 106 is configured to perform the application logic functions described more fully below. In one embodiment, the functions performed by the application server, as described more fully below, are divided among two or more computers so as to optimize the distribution of work load among the computers and to minimize the time the system takes to respond to inputs and queries from users.

When an alert has been received and is being processed, as described more fully below, the application server 106 comprises an alert software object 108 used to store data relating to and perform certain processing with respect to an alert, as described more fully below. The alert software object 108 uses data provided in an alert sent by alerting user 102, along with data retrieved from database 110 associated with the application server 106, to process the alert. Certain of the data that results from the processing performed by alert software object 108 is then stored in database 110. In one embodiment, database 110 is stored in memory in application server 106. In one embodiment, database 110 is stored in a separate structure, such as a database server, connected, either directly or through a communication link, with application server 106.

In one embodiment, when a request from a participant for a list of URLs for items of current interest is received, the application server 106 comprises a hot list software object 112 used to store certain data concerning and perform certain operations with respect to the request from the participant and the response thereto. In one embodiment, the hot list object 112 comprises an interest category array 114. In one embodiment, the interest category array 114 is comprised of one or more interest category objects, each of which stores data relating to one interest category identified in the participant's request as being of interest to the participant. In one embodiment, the hot list object 112 comprises a hot token array 116. The hot token array 116 is comprised of a hot token object for each URL of current interest in the database for the category or categories indicated in the participant's request.

As indicated in FIG. 1, an alert sent by an alerting user includes, in one embodiment, at least the URL of the web content considered by the alerting user to be of current interest. In one embodiment an alert may also include an interest selection, meaning a category or subject area to which the alerting user believes the web content relates, and/or a caption in which the alerting user may provide text indicating what the alerting user believes to be of current interest in the web content.

Figure 2A:
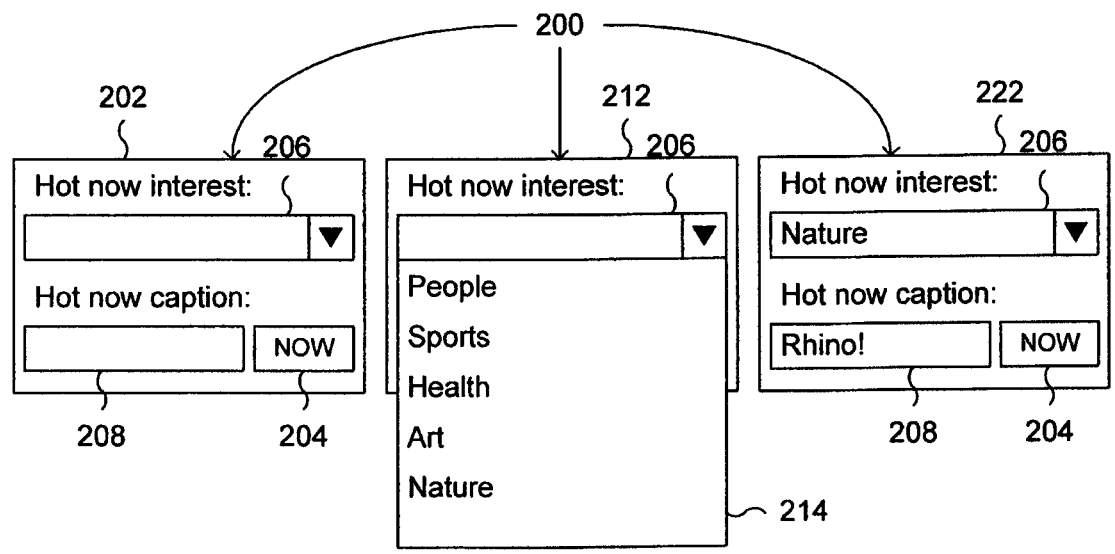
FIG. 2A is a series of three screen shots showing three different states of an alert submission display 200 used in one embodiment.

FIG. 2A is a series of three screen shots showing three different states of an alert submission display 200 used in one embodiment. One view is comprised of blank alert submission display 202. Blank alert submission display 202 includes a submission button 204 used to submit an alert with respect to the URL of the web content currently being accessed by the alerting user. Blank alert submission display 202 also includes an interest category selection area 206. In one embodiment, as illustrated in FIG. 2A, the interest category selection area 206 is configured as a pull down menu activated by selecting the downward arrow on the right side of interest category selection area 206. Blank alert submission display 202 also includes a caption area 208 in which an alerting user may enter text associated with the alert, such as text indicating why the alerting user believes the URL to be of current interest. As shown in interest category selection display 212, when the downward arrow button on the right side of interest category selection area 206 is selected, a pull down menu 214 is presented, and an alerting user may select one of the interest categories listed in the pull down menu 214 in the manner well known in the art. As shown in the completed alert submission display 222 of FIG. 2A, the interest category selected by the alerting user is shown in the interest category selection area 206. In the example shown in FIG. 2A, the category selected is "NATURE". In addition, the caption entered by the alerting user, the comment "rhino!" in the example shown in FIG. 2A, appears in the caption area 208 of the alert submission display. As noted above, the alerting party posts the alert to the application server via the Internet and the web server by selecting the submission button 204.

Figure 2B:
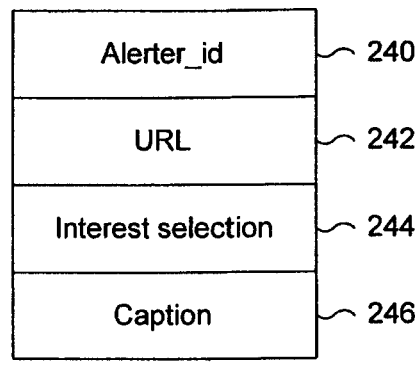
FIG. 2B is an illustration of the data structure used in one embodiment for alerts submitted by an alerting user.

FIG. 2B is an illustration of the data structure used in one embodiment for alerts submitted by an alerting user. The alert includes an ALERTER_ID field 240 in which data identifying the alerting user is provided. The alert also includes a URL field 242 in which the URL of the web content or other electronic resource being accessed by the alerting user when the alert was sent is stored. The alert also includes an INTEREST SELECTION field 244 in which the interest category selected by the alerting user, if any, is provided. Finally, the alert includes a CAPTION field 246 in which the caption entered by the alerting user, if any, is provided.

Figure 3:
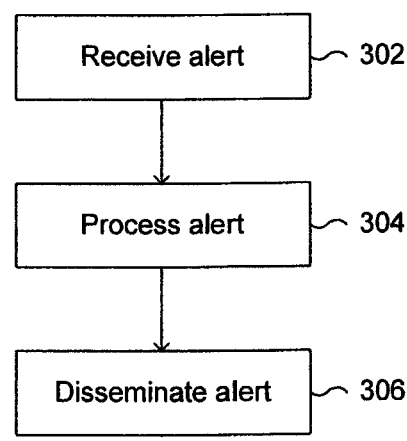
FIG. 3 is a flow chart illustrating a process used in one embodiment to alert users of items of current interest.

FIG. 3 is a flow chart illustrating a process used in one embodiment to alert users of items of current interest. The process begins in step 302 in which an alert indicating that an item is of current interest is received. Next, in step 304, the alert is processed. Finally, in step 306, the alert is disseminated to one or more participants, as described more fully below.

Figure 4:
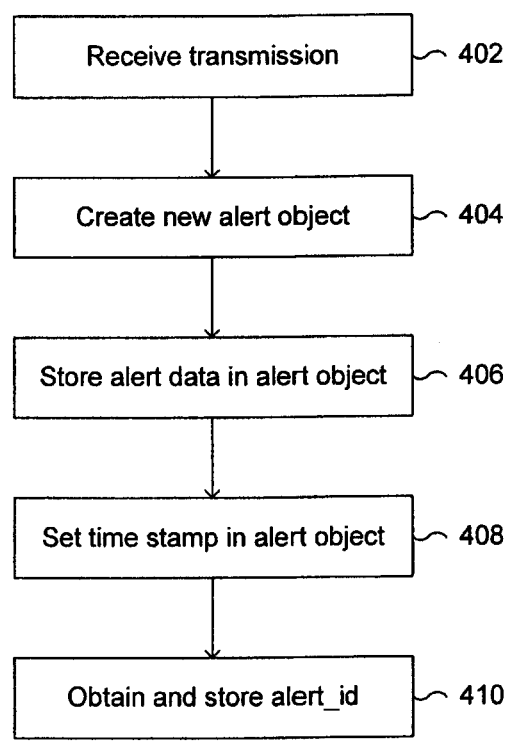
FIG. 4 is a flow chart illustrating a process used in one embodiment to receive an alert, as in step 302 of FIG. 3.

FIG. 4 is a flow chart illustrating a process used in one embodiment to receive an alert, as in step 302 of FIG. 3. The process begins with step 402 in which a transmission comprising an alert is received from an alerting user. As noted above, in one embodiment an alert includes at least the URL of the web content being accessed by the alerting user at the time the alert was sent. In one embodiment, as described above, the alert also includes data indicating the identity of the alerting user. In addition, as noted above, the alert may include, at the option of the alerting user, an interest selection and/or a caption for the alert. The process shown in FIG. 4 continues with step 404 in which a new alert software object is created at the application server, such as application server 106 of FIG. 1. Next, in step 406, the data provided in the alert is stored in the alert object. In step 408, a time stamp indicating the time when the alert was received is stored in the alert object. Finally, in step 410, an ALERT_ID, which uniquely identifies the alert and distinguishes the alert and its associated object from other alerts and their associated objects, is obtained and stored in the alert object.

FIG. 5 is an illustration of the data structure used in one embodiment for the alert object. Data field 502 is used to store the ALERT_ID described above. Data field 504 is used to store the time stamp described above. Data fields 506-512 are used to store the ALERTER_ID, URL, INTEREST SELECTION, and CAPTION described above, respectively. ALERT INTENSITY field 514 is used to store a number indicating the intensity or weight to be afforded to the incoming alert. The ALERT INTENSITY is determined as described below. The alert object also stores properties retrieved from various database tables, described more fully below. For example, the alert object includes a LAST_TIME field 516 used to store data retrieved from the database indicating the time of the most recent prior alert. The alert object also includes a LAST_RANK field 518 used to store a numerical ranking retrieved from the database that indicates the overall level or degree of current interest of an item as indicated by all of the alerts that have been submitted with respect to a URL during the current period of activity with respect to the URL through the most recent prior alert. The alert object also includes a LAST_WEIGHT field 520 used to store data retrieved from a database table, as described below, that represents the number of prior alerts received for the URL in the interest category indicated by the current alert, as described more fully below. The alert object also includes a LAST_INTENSITY_SUM field 522 in which the sum of the intensities of all prior alerts for the URL during the current period of activity with respect to the URL, which sum is retrieved from a database table described more fully below, is stored. Finally, the alert object includes a LAST_NORMAL_TIME field 524 used to store the time, retrieved from a database table as described more fully below, when the last normalization calculation was performed.

Figure 6:
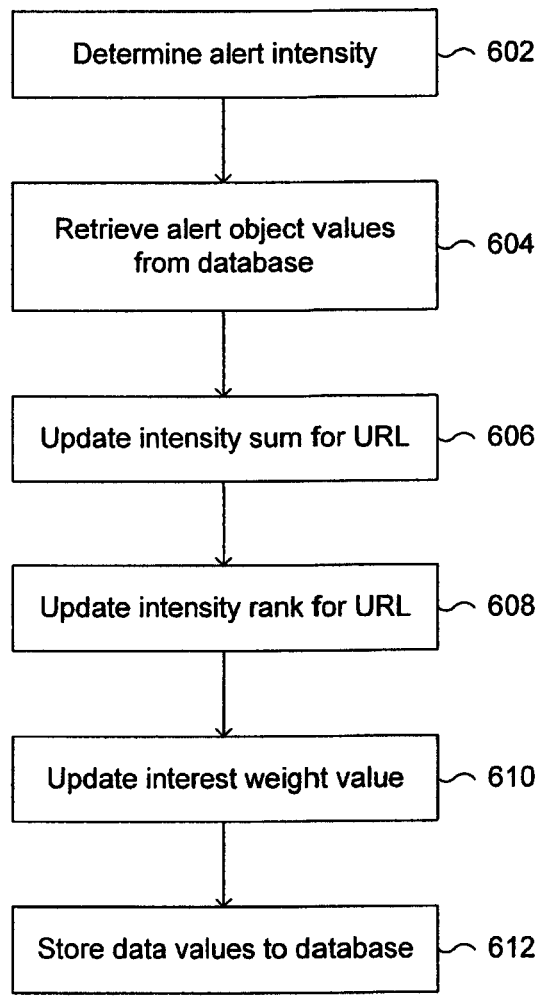
FIG. 6 is a flowchart illustrating a process used in one embodiment to process an alert, as in step 304 of FIG. 3.

FIG. 6 is a flowchart illustrating a process used in one embodiment to process an alert, as in step 304 of FIG. 3. The process begins with step 602 in which the intensity of the alert is determined. The term intensity as used herein refers to the weight or value to be assigned to a particular alert regarding an item. In one embodiment, the intensity is a value between 0 and 1. In one embodiment, the value assigned for the intensity is higher if the alerting user selects an interest category for the alert than it would have been if the same alerting party had not selected an interest category. In one embodiment, the intensity value is higher if the alerting party provides a caption for the alert than it would have been if the alerting party had not provided a caption. In one embodiment, the intensity of an alert is increased if it is determined that the alerting party is a party that has provided particularly relevant or helpful alerts in the past, or is trusted for some other reason, such as expertise, academic credentials, or reputation within a particular community of interest. In one embodiment, the intensity of an alert is decreased if it is determined that the alerting party has provided unhelpful or erroneous alerts in the past, or if it is determined that the alerting party cannot be trusted as much as other alerting parties for other reasons, such as reputation in the relevant community. In one embodiment, it is possible to provide both an active alert by selecting an alert button and to provide a passive alert by merely accessing a URL with respect to which an alerting party previously submitted an active alert. In one embodiment, an active alert is assigned a higher intensity value than a passive alert.

For example, a passive alert may be arbitrarily assigned a baseline intensity value of 0.3 and an active alert a baseline intensity value of 0.5. For an active alert, 0.1 could be added for each of the following conditions that is satisfied by the alert: an interest category selection was included in the alert; a caption was included in the alert; and/or the source of the alert is particularly trusted. Conversely, 0.1 could be subtracted from the intensity of an alert from a source known to be unreliable. Alternatively, alerts from sources known to be unreliable may be blocked and not assigned any intensity value.

The process illustrated in FIG. 6 continues with step 604 in which data values for the alert object data fields described above that are not included in the alert transmission received from the alerting party are retrieved from the database.

Next, in step 606, the intensity sum for the URL, which is the sum of the intensity values for all of the alerts with respect to the URL, is updated. Next, in step 608, the intensity rank for the URL is updated to reflect the new alert. In step 610, the interest weight value, which represents the number of alerts for a particular URL in which a particular category of interest was indicated, is updated. Finally, in step 612, the updated data values are stored to the database.

Figure 7:
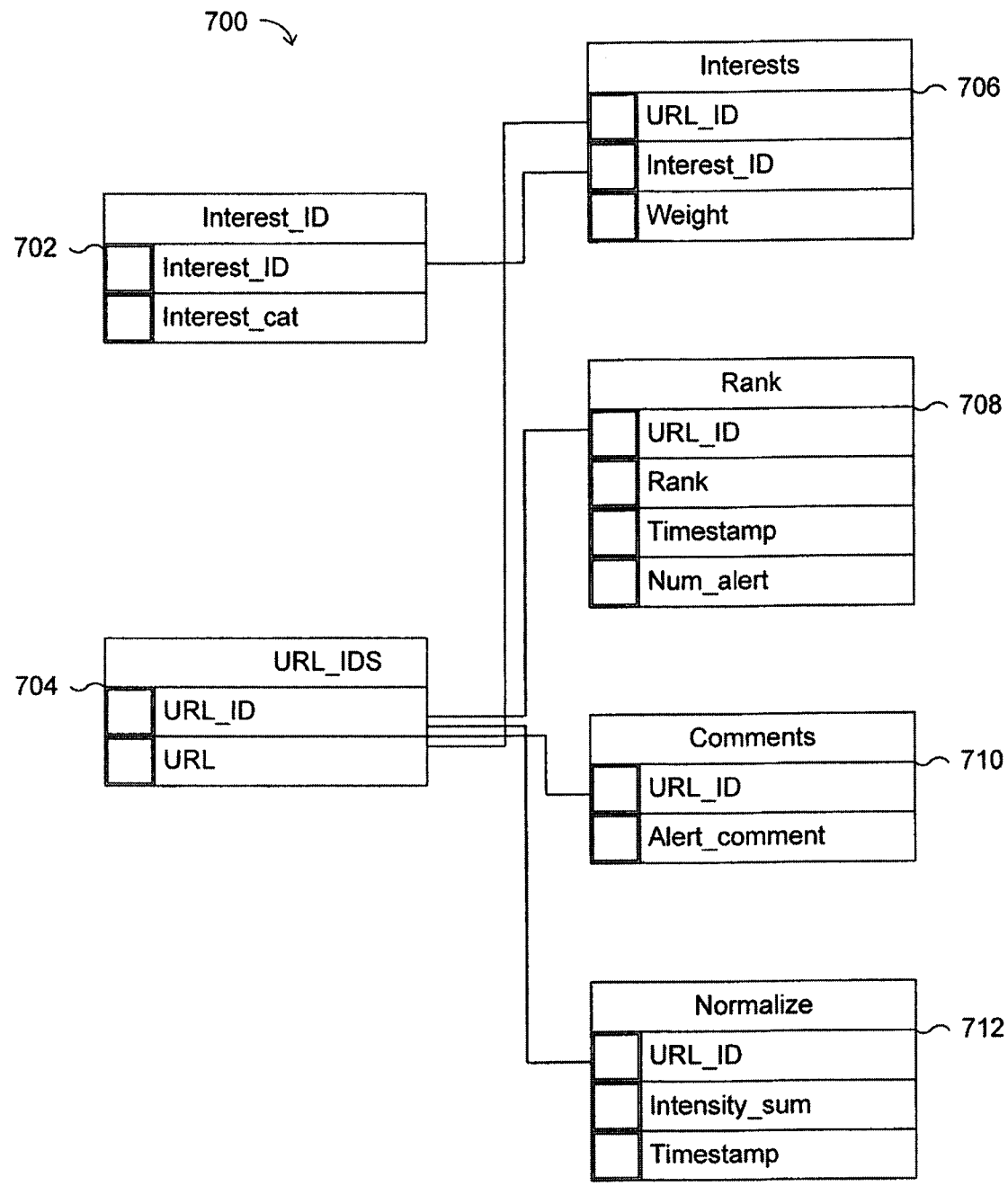
FIG. 7 is an illustration of six database tables 700 used in one embodiment to store data concerning alerts received with respect to items of current interest associated with URLs.

FIG. 7 is an illustration of six database tables 700 used in one embodiment to store data concerning alerts received with respect to items of current interest associated with URLs. The database tables 700 include an INTEREST_ID table 702 used to provide a unique identifier, labeled INTEREST_ID in FIG. 7, for each interest category, denominated INTEREST_CAT in FIG. 7. Database tables 700 also include a URL_ID table 704 used to provide a unique identifier, labeled URL_ID in FIG. 7, for each URL.

Database tables 700 also include an INTERESTS table 706 used to store the interest weight, denominated WEIGHT in FIG. 7, for each interest category with respect to which an alert has been submitted for a URL. As noted above, in one embodiment, the weight is the total number of alerts received within a given interest category for a URL. For example, if five alerts indicating the interest category People and three alerts indicating the interest category Nature have been submitted for a URL, there will be two entries for the URL in the interest table, one for each interest category. The weight in the entry for the category People would be "5" and the weight for the URL in the category Nature would be "3".

The database tables 700 also include a RANK table 708 used to store a rank value for each URL associated with an item of current interest, a time stamp when the rank was last calculated, and a data entity denominated NUM_ALERT in FIG. 7, which represents the total number of alerts submitted for the URL.

The database tables 700 also include a COMMENTS table 710 used to store any comment submitted with an alert and to associate each comment with the corresponding URL. Finally, the database tables 700 include a NORMALIZE table 712 used to store the sum of the intensities of the alerts submitted for a URL (INTENSITY_SUM) and a time stamp indicating when the last normalization was performed.

Figure 8A:
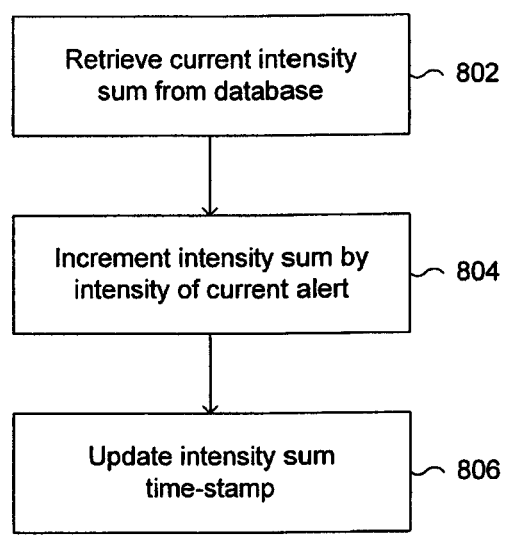
FIG. 8A is a flowchart illustrating a process used in one embodiment to update the intensity sum for a URL, as in step 606 of FIG. 6.

FIG. 8A is a flowchart illustrating a process used in one embodiment to update the intensity sum for a URL, as in step 606 of FIG. 6. The process begins with step 802 in which the current intensity sum is retrieved from the database, as in step 604 of FIG. 6. If there is no existing record for the URL in the NORMALIZE table (i.e., the alert being processed is the first alert for the URL), a URL_ID is assigned for the URL, a record for the URL is created in the NORMALIZE table, and the retrieved current intensity sum is set to zero. Next, in step 804, the intensity sum is incremented by the amount of the intensity of the current alert. For example, if the previous intensity sum was 4.7 and the intensity for the current alert was 0.5, the intensity sum would be incremented to the value of 4.7+0.5=5.2. Finally, in step 806, the intensity sum time stamp stored in NORMALIZE table 712 shown in FIG. 7 (which is the same as the LAST_NORMAL_TIME stored in field 524 of FIG. 5) is updated to the time stamp of the current alert. In one embodiment, the intensity sum is updated, and a normalization is performed as described more fully below, each time a new alert is received for a URL. In such an embodiment, the time stamp stored in the NORMALIZE table 712 of FIG. 7 will be the same as the time stamp stored in the RANK table 708 of FIG. 7, as both the rank and the intensity sum are updated each time an alert is received.

Figure 8B:
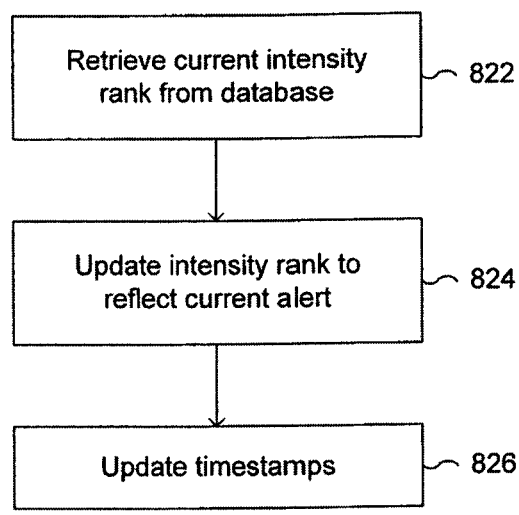
FIG. 8B is a flowchart illustrating a process used in one embodiment to update the intensity rank for a URL to reflect the intensity of the current alert.

FIG. 8B is a flowchart illustrating a process used in one embodiment to update the intensity rank for a URL to reflect the intensity of the current alert. The process begins with step 822 in which the current intensity rank is retrieved from the database, as in step 604 of FIG. 6. As shown in FIG. 7, in one embodiment, this value is retrieved from the RANK table 708. If there is no entry in the RANK table for the URL, i.e., the alert being processed is the first alert for the URL, a record in the RANK table is created for the URL (identified by the URL_ID assigned to the URL) and the current intensity rank is set to zero. Next, in step 824, the intensity rank is updated to reflect the intensity of the current alert. In one embodiment, if the current alert has been received within a predetermined time interval τ after the last alert for the URL, the updated intensity rank is a function of the last rank and the intensity of the current alert in accordance with the following formula:

$$r'=(k-r)*I_{alert}+r$$

Where k is the maximum intensity value, which as noted above is one in one embodiment, r is the last rank, r' is the updated rank, and $I_{alert}$ is the intensity value for the current alert. Restating the formula to reflect the fact that in one embodiment, the maximum intensity level k=1, the formula becomes:

$$r'=(1-r)*I_{alert}+r$$

If an alert is the first alert received for a URL, the last rank is considered to be zero (r=0) and the above formula results in the new rank being equal to the intensity value for the current alert. For example, if the intensity value for the current alert is 0.5, the updated heat rank r'=(1−0)*0.5+0=0.5. If a subsequent alert of intensity 0.6 is received, the formula results in the updated intensity rank being calculated as follows:

$$r'=(1-0.5)*0.6+0.5=0.8$$

As the example illustrates, so long as additional alerts are received within the time interval each incoming alert will cause the intensity rank for the URL to increase until the intensity rank approaches the maximum intensity value k (in the example, the rank would approach k=1). The speed with which the intensity rank for a particular URL approaches the maximum value k depends on the intensity value of the incoming alerts and the frequency with which alerts are received.

In one embodiment, if the predetermined time interval r referred to above has expired between the last alert and the current alert, the updated intensity rank is calculated by a modified formula which reduces the updated intensity rank in accordance with an exponential decay function that effectively adjusts the updated intensity rank downward to account for the passage of time between the last alert and the current alert. All other things being equal, this adjustment would result in a site that received alerts more frequently to have a higher rank than a site that received alerts separated by more than the predetermined time interval. To determine the updated intensity rank as adjusted for the passage of time, the following formula is used in one embodiment:

$$r'=[(k-4)*I_{alert}+r]*e^{-\alpha(\Delta t-\tau)}$$

In this formula, k, r, and $I_{alert}$ are the same as above, $\alpha$ is the weight assigned to the decay function (a higher value for $\alpha$ will result in a greater amount of decay per unit time), $\Delta t$ is the amount of time that has elapsed between the current alert and the previous alert, and $\tau$ is the predetermined time interval referred to above.

In one embodiment, the updated intensity rank is normalized by multiplying the updated intensity rank by two factors. The first factor is a low frequency enhancement factor designed to enhance the intensity rank of URLs with respect to which alerts are received relatively less frequently relative to the intensity rank of URLs regarding which alerts are received more frequently. The purpose of this enhancement factor is to ensure that sites that are of current interest only from time to time are not masked by the intensity ranking calculated for sites that are of current interest more frequently. In one embodiment, the low frequency enhancement factor is the time of the current alert minus the time of the last update to the intensity rank.

The second factor by which the updated intensity rank is multiplied is a low volume enhancement factor The purpose of this factor is to ensure that the intensity rank of URLs that are of current interest only to a smaller community of users will not be overshadowed by the intensity rank of URLs that are of current interest to a large community. In one embodiment, the low volume enhancement factor is the inverse of the intensity sum for the URL. Accordingly, in one embodiment, the normalized intensity rank is determined by the following formula:

$$r''=r'*(t_{current}-t_{first})*1/n$$

Where r″=normalized intensity rank
r′=updated intensity rank before normalization
$t_{current}$=timestamp of current alert
$t_{first}$=timestamp of first alert for URL
n=intensity sum=sum of all alert intensities for URL.

Once the intensity rank has been updated and normalized, the process shown in FIG. 8B continues with step 826 in which the time stamps for the normalization and intensity rank tables are updated to the time stamp of the current alert.

Figure 8C:
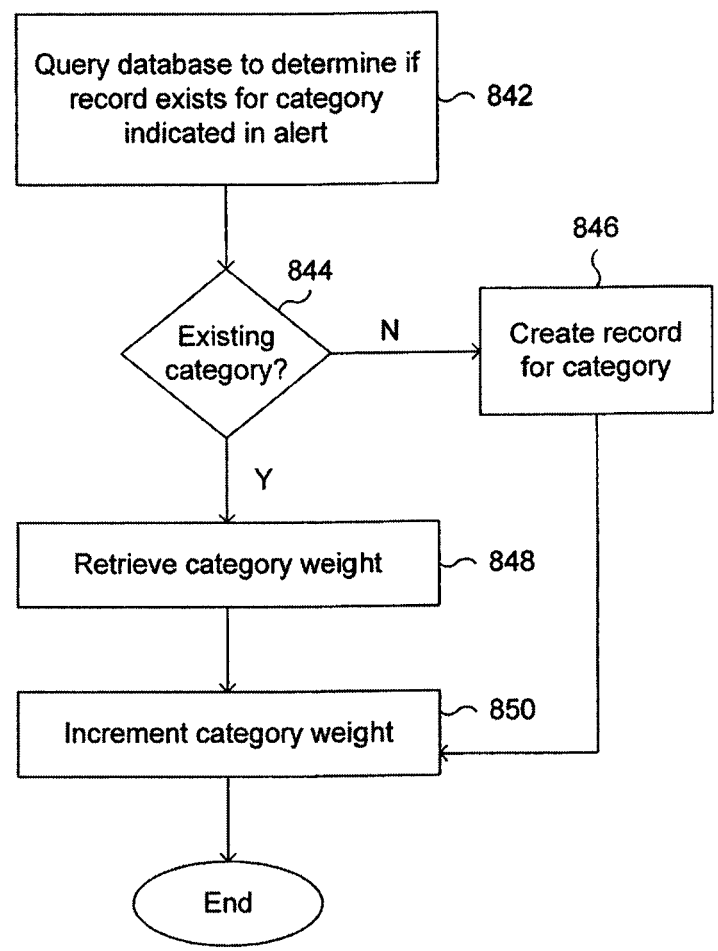
FIG. 8C is a flowchart illustrating a process used in one embodiment to update the interest category weight for a URL with respect to the interest category indicated in an alert.

FIG. 8C is a flowchart illustrating a process used in one embodiment to update 20 the interest category weight for a URL with respect to the interest category indicated in an alert. The process begins with step 842 in which the database is queried to determine if a record exists for the URL for the interest category indicated in the alert. In step 844, it is determined whether the query performed in step 842 identified an existing database table entry for the URL for the interest category indicated in the alert (i.e., whether a prior alert indicated the same interest category for the URL). If it is determined in step 844 that a database entry does not exist for the interest category with respect to the URL, the process proceeds to step 846 in which a record in the INTEREST table is created for the URL with respect to the interest category of the alert. The process then proceeds to step 850 in which the weight value is incremented for the URL with respect to the interest category by increasing the value from zero to one for the new record.

If it is determined in step 844 that there is an existing record for the interest category for the alert with respect to the alert URL, the process proceeds to step 848 in which the weight value stored in the record is retrieved. The process then continues to step 850 in which the retrieved weight is incremented by one to reflect the current alert. For example, if the retrieve weight were 7, the weight would be incremented to 8 in step 850 to reflect the current alert.

Figure 9:
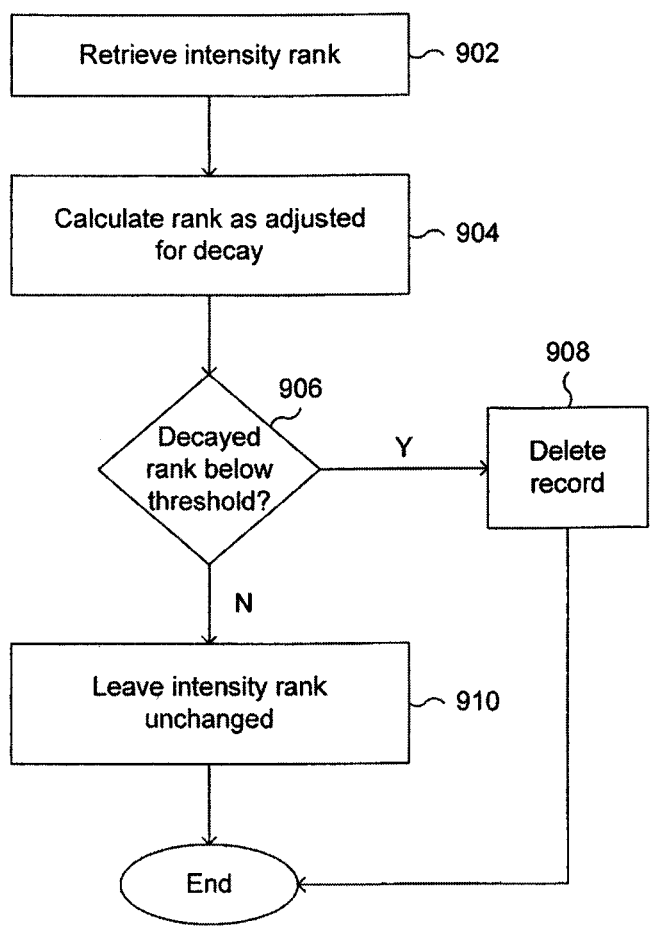
FIG. 9 is a flowchart illustrating a process used in one embodiment to purge records for URLs that are determined to be no longer of current interest by calculating a time decayed intensity rank at intervals, even if no new alert has been received, and purging from the database the records for a URL if the time decayed intensity rank is below a prescribed threshold.

FIG. 9 is a flowchart illustrating a process used in one embodiment to purge records for URLs that are determined to be no longer of current interest by calculating a time decayed intensity rank at intervals, even if no new alert has been received, and purging from the database the records for a URL if the time decayed intensity rank is below a prescribed threshold. The process shown in FIG. 9 begins with step 902 in which the intensity rank for a URL is retrieved. In one embodiment, the intensity rank is retrieved and the process shown in FIG. 9 is performed, at a predetermined arbitrary time interval $\tau$.

The process shown in FIG. 9 continues with step 904 in which an intensity rank adjusted for time decay is calculated for the URL. In one embodiment, the time decayed 5 intensity rank is determined by the following formula:

$$r_t=e^{-\alpha(\Delta t-\tau)}*r$$

Where
$r_t$=time decayed intensity rank
$\alpha$=weight of decay function
$\Delta t$=time elapsed since last alert
$\tau$=predetermined time interval referred to above
r=stored intensity rank.

As can be seen from the above formula, the time decayed intensity rank decays exponentially over time if no new alerts are received. If it is determined in step 906 of the process shown in FIG. 9 that the time decayed intensity rank is below the intensity rank threshold, the process proceeds to step 908 in which the record for the URL is deleted. If it is determined in step 906 that the time decayed intensity rank is not below the intensity rank threshold, the process proceeds to step 910 in which the intensity rank as stored in the database is left unchanged.

Figure 10:
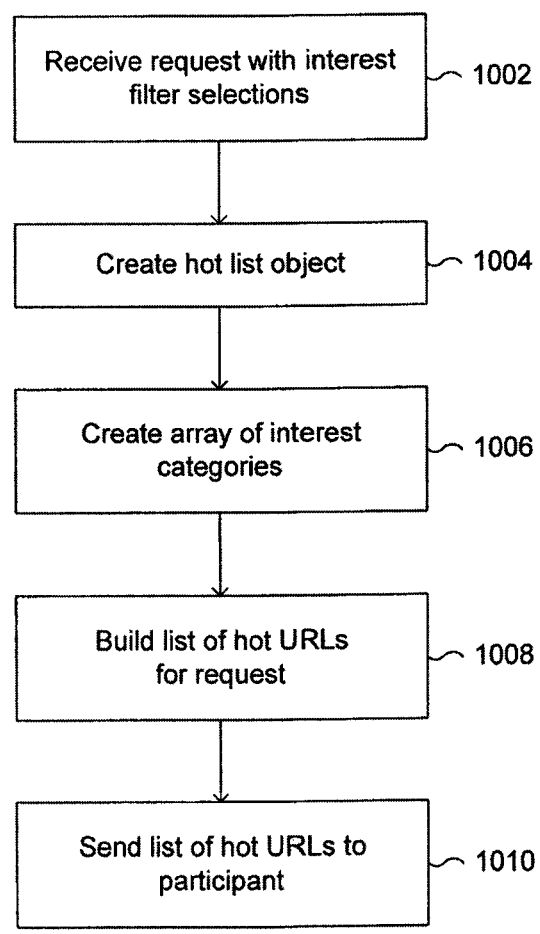
FIG. 10 is a flowchart illustrating a process used in one embodiment to disseminate an alert to a participant, as in step 306 of FIG. 3.

FIG. 10 is a flowchart illustrating a process used in one embodiment to disseminate an alert to a participant, as in step 306 of FIG. 3. The process begins with step 1002 in which a request containing interest category filter selections made by the participant is received. Next, in step 1004, a hot list software object is created at the application server, as shown in FIG. 1 and described above. Then, in step 1006, an array of interest categories, such as the interest category array 114 described above with respect to FIG. 1, is created within the hot list object. Next, in step 1008, a list of hot URLs responsive to the request is built. Finally, in step 1010, the list of hot URLs responsive to the request is sent to the participant.

Figure 11:
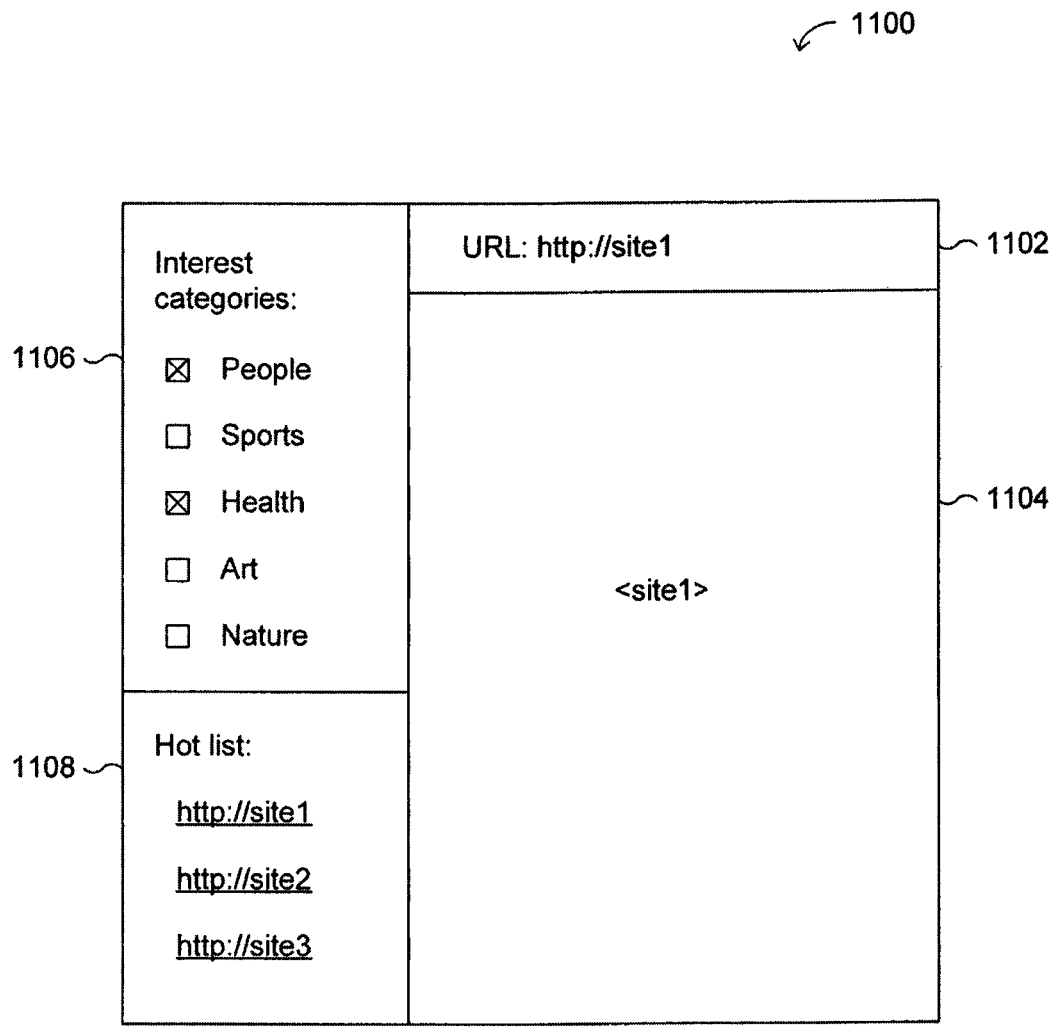
FIG. 11 shows an exemplary participant display 1100 used in one embodiment to disseminate alert information to a participant.

FIG. 11 shows an exemplary participant display 1100 used in one embodiment to disseminate alert information to a participant. The display 1100 includes a URL entry and display area 1102. The URL for the web content or other electronic resource currently being accessed by the participant is displayed in the URL entry and display area 1102, and the participant may enter the URL for the web content or other electronic resource the participant wishes to access manually in the URL entry and display area 1102, as in the URL or address field for a World Wide Web browser. The display 1100 also includes a content display area 1104 in which the web or other content for the URL listed in URL entry and display area 1102 is displayed. For example, if the URL is the URL of web content accessed via the Internet, the web content associated with the URL will be displayed in URL display area 1104.

The display 1100 also includes an interest category filter selection area 1106 in which interest categories are listed along with a check box for each category listed. The participant selects the check box for each interest category for which the participant would like URLs of current interest to be included in the participant's hot list.

In one embodiment, filter selection area 1106 includes for each category a sensitivity entry area (not shown in FIG. 11) to be used to provide an indication of the participant's degree or level of interest. For example, in one embodiment a participant may enter a whole number from 1 to 5, with 1 indicating the lowest level of sensitivity (e.g., the participant does not want to receive a notification regarding a URL in the category unless a significant number of alerts have been received regarding the URL, or only when the intensity rank for the URL exceeds a predetermined, relatively high threshold) and 5 representing the highest level of sensitivity (e.g., the participant wants to receive a notification even if there has only been one or relatively few alerts concerning a URL, or if one or more alerts have been received but the intensity rank for the URL is relatively low).

In one embodiment, a request is sent to the application server automatically at predetermined intervals. The request contains the interest categories that are in the selected state at the time the request is sent. In one embodiment, the display 1100 includes a submit button (not shown in FIG. 11) that, when selected, causes a request containing the interest categories selected by the participant at the time to be posted to the application server via the Internet.

The display 1100 also includes a hot list display area 1108 in which the hot list of URLs returned by the system to the participant in response to a request is presented. As shown in FIG. 11, in one embodiment, each URL is represented by a hypertext link that, when selected, causes the URL of the listed cite to appear in the URL entry and display area 1102 and the content associated with the URL to be displayed in the URL display area 1104.

In one embodiment, the display 1100 is modified to include an alert submission display area such as the alert submission display shown in FIG. 2A. This would permit a participant to send an active alert to the application server if the participant encounters a URL of current interest.

Figure 12:
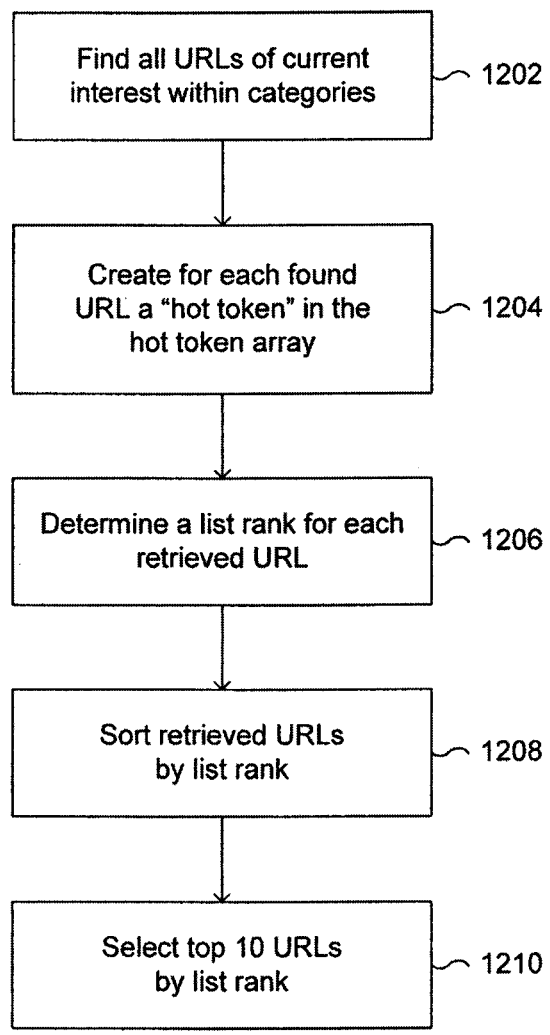
FIG. 12 is a flowchart illustrating a process used in one embodiment to build a list of hot URLs responsive to a request, as in step 1008 of FIG. 10.

FIG. 12 is a flowchart illustrating a process used in one embodiment to build a list of hot URLs responsive to a request, as in step 1008 of FIG. 10. The process begins with step 1202 in which all URLs of current interest within the categories indicated in the request are found.

Next, in step 1204, a "hot token" object is created in a hot token array within the hot list object for each URL found in step 1202, as described above with respect to hot token array 116 shown in FIG. 1. Each hot token object holds the URL_ID, the WEIGHT for the URL with respect to the interest category indicated in the request, the sum of the WEIGHT values for each category associated with the URL in the database, and the intensity rank (RANK) for the URL.

Next, in step 1206, a list rank is determined for each URL retrieved in response to the request. In one embodiment, a list rank value is calculated for each URL and is used to determine the list rank (or the order in which the responsive URLs will be placed to determine which URLs will be provided). In one embodiment, an initial list rank value is calculated for each URL based on the interest category weight(s) for the URL with respect to the interest category or categories in the request, along with the interest weight for any interest category or categories that are associated with the URL in the database but which are not among the categories indicated in the request. In one embodiment, the initial list rank value "v" of a URL number "n" ($v_n$) is calculated according to the following formula:

$$v_n = \frac{\sum \sqrt{f_k}}{\sum \sqrt{f_m}}$$

Where $v_n$=initial list rank value of URL "n"
$f_k$=interest weight for URL for each request category
$f_m$=interest weight for each category associated with URL in database For example, if at the time of the request there had been ten alerts submitted for a particular URL and three of the alerts were associated with a first category, two with a second category and five with a third category, and if a request were received that included among the request categories the first and third categories, the initial list rank value "v" for URL number "n" calculated in accordance with the above formula would be as follows:

$$v_n = \frac{\sqrt{3} + \sqrt{5}}{\sqrt{3} + \sqrt{2} + \sqrt{5}} \approx 0.74$$

It should be noted that the use of the square root of the weight for each category tends to give relatively greater effect to the weight of interest categories associated with the URL by a minority of alerting users because using the square root reduces the net effect of the greater weight value associated with interest categories indicated by the majority of alerting users. As with the normalization of the intensity rank described above, this has the effect of giving more visibility to matters of interest to a relatively smaller community.

In an embodiment in which the participant indicates a level of sensitivity with respect to each selected interest category, as described above, the formula for the initial list rank value is modified to take into consideration the sensitivity "s" indicated for each category of interest. In one embodiment, the initial list rank value formula is modified as follows:

$$v_n = \frac{\sum \sqrt{s_k * f_k}}{\sum \sqrt{s_m * f_m}}$$

Where $v_n$=initial list rank value of URL "n"
$f_k$=interest weight for URL for each request category
$f_m$=interest weight for each category associated with URL in database
$s_k$=sensitivity indicated for request category "k"
$s_m$=sensitivity indicated for request category corresponding to interest category "m", if any ($s_m$=1 for interest categories not in request).

For example, in the example described above, assume the participant indicated a sensitivity level of 1 with respect to the first category and 5 with respect to the third category, the initial list rank value would be calculated as follows:

$$v_n = \frac{\sqrt{1*3} + \sqrt{5*5}}{\sqrt{1*3} + \sqrt{1*2} + \sqrt{5*5}} \approx 0.83$$

(As noted above, the sensitivity level $s_m$ used for the second category, having weight "2" in the denominator, is set at "1" because in the example the participant did not select that category).

The initial list rank value determined by this calculation (0.83) is greater than the initial list rank value found in the above calculation of an initial list rank value in an embodiment in which sensitivity levels are not assigned or considered (0.74). This illustrates the effect of assigning sensitivity levels. The initial list rank value determined in the second calculation, which takes into account a sensitivity level for each category, is higher than it would have been found to be without regard to sensitivity because the participant indicated a higher sensitivity for one of the categories with respect to which alerts had been received for the URL.

In this way, high-sensitivity users are more likely to become aware of and access a URL with respect to which one or more alerts have been received in a category for which the user has indicated a high sensitivity. If such a high-sensitivity user chose to send alerts of their own with respect to the URL, such activity would increase the intensity rank for the URL (as described above) and would tend to propagate the original alert or alerts to lower-sensitivity users (because the intensity rank is factored into the final list rank used to identify the final list of URLs to be provided to a participant, as described below). If such lower-sensitivity users were to send even more alerts, the original alerts would be further propagated to even lower-sensitivity users, and so on.

In one embodiment, the initial list rank value determined by the interest category weights, as described above, is used along with the intensity rank for the URL to calculate a final list rank value for the URL. In one embodiment, the final list rank value for URL number "n" is calculated in accordance with the following formula:

$$v_n' = r_n(\alpha + (1-\alpha)v_n)$$

Where
$v_n'$=final list rank value
$r_n$=intensity rank for URL
$\alpha$=weight factor ($0 \leq \alpha \leq 1$)
$v_n$=initial list rank value In the above equation, the weight factor $\alpha$ determines the relative weight afforded to the intensity rank for the URL and the initial list rank calculated based on the interest category weights as described above. If the value for $\alpha$ is selected to be 1, the final list rank would be equal to the intensity rank for the URL and the initial list rank would not factor into the final list rank at all. Therefore, a higher weight factor will tend to increase the influence of the intensity rank for the URL and decrease the effect of the initial list rank. Stated another way, a low weight factor tends to give more effect to the extent to which the interest categories associated with the URL in the database match the interest categories indicated in the request from the participant. Conversely, a higher weight factor tends to give greater effect to the overall popularity of the URL as measured by the intensity rank.

Once the list rank for each retrieved URL has been calculated in step 1206, in step 1208 the retrieved URLs are sorted by list rank. Then, in step 1210, the top ten URLs by list rank are selected as the hot list of URLs to be sent to the participant in response to the request. The number ten is an arbitrary number and either a fewer number or greater number of URLs may be included.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

We claim:

1. A computer-implemented method of informing a participant user that an item accessible by the participant user via a network is of current interest, comprising:
receiving via the network an indication from a source user other than the participant user that the item is of current interest;
processing the indication using one or more computer processors including:
determining an intensity value for the indication including adjusting the intensity value based on data regarding trustworthiness, reliability, credibility, reputation, or expertise of the source user; and
calculating a rank for the item based on the adjusted intensity value for the indication, the rank indicating a level of current interest of the item relative to other items accessible by the participant user via the network; and
informing the participant via the network that the item is of current interest based on the rank for the item.

2. The method of claim 1 wherein the indication is received from the source user while the source user is viewing the item.

3. The method of claim 1 wherein the indication is processed contemporaneously with receiving the indication from the source user.

4. The method of claim 1 wherein the determining further includes determining the intensity value based on a type of activity taken by the source user regarding the item.

5. The method of claim 4 wherein data regarding the type of activity taken by the source user is received with the indication.

6. The method of claim 4 wherein a higher intensity value is determined for the indication in response to the activity taken by the source user being of an active type and a lower intensity value is determined for the indication in response to the activity taken by the source user being of a passive type.

7. The method of claim 1 wherein the intensity value is adjusted based on data regarding reputation of the source user.

8. The method of claim 1 wherein the intensity value is adjusted based on data regarding credibility of the source user.

9. A computer-implemented method of informing a participant user that an item accessible by the participant user via a network is of current interest, comprising:
receiving via the network an indication from a source user other than the participant user that the item is of current interest;
processing the indication using one or more computer processors including:
determining an intensity value for the indication including adjusting the intensity value based on the source user providing optional data with the indication; and calculating a rank for the item based on the adjusted intensity value for the indication, the rank indicating a level of current interest of the item relative to other items accessible by the participant user via the network; and informing the participant user via the network that the item is of current interest based on the rank for the item.

10. The method of claim 9 wherein the indication is received from the source user while the source user is viewing the item.

11. The method of claim 9 wherein the indication is processed contemporaneously with receiving the indication from the source user.

12. A computer-implemented method of informing a participant user that an item accessible by the participant user via a network is of current interest, comprising:

receiving via the network an indication from a source user other than the participant user that the item is of current interest;

processing the indication using a computer processor including:

determining an intensity value for the indication including adjusting the intensity value based on data regarding quality of indications previously received from the source user for other items accessible by the source user via the network; and calculating a rank for the item based on the adjusted intensity value and the time decay for the indication, the rank indicating a level of current interest of the item relative to other items accessible by the participant user via the network; and informing the participant via the network that the item is of current interest based on the rank for the item.

13. The method of claim 12 wherein the indication is received from the source user while the source user is viewing the item.

14. The method of claim 12 wherein the indication is processed contemporaneously with receiving the indication from the source user.

15. A computer-implemented method of informing a participant user that an item accessible by the participant user via a network is of current interest, comprising:

receiving via the network an indication from a source user other than the participant user that the item is of current interest;

processing the indication using a computer processor including:

determining an intensity value for the indication including adjusting the intensity value based on data provided with the indication identifying an optional activity the source user has taken in relation to the item; and calculating a rank for the item based on the adjusted intensity value and the time decay for the indication, the rank indicating a level of current interest of the item relative to other items accessible by the participant user via the network; and informing the participant via the network that the item is of current interest based on the rank for the item.

16. The method of claim 15 wherein the indication is received from the source user while the source user is viewing the item.

17. The method of claim 15 wherein the indication is processed contemporaneously with receiving the indication from the source user.

18. The method of claim 15 wherein:

the optional activity occurs in conjunction with a second activity taken by the source user in relation to the item; and the determining further includes determining the intensity value based on data provided with the indication identifying the second activity and adjusting the intensity value based on the data provided with the indication identifying the optional activity.

19. The method of claim 1 wherein the indication is received in real time.

20. The method of claim 1 wherein the intensity value is adjusted based on data regarding reliability of the source user.

21. The method of claim 1 wherein the intensity value is adjusted based on data regarding trustworthiness of the source user.

22. The method of claim 1 wherein the intensity value is adjusted based on data regarding expertise of the source user.

23. The method of claim 1 wherein the trustworthiness, reliability, credibility, reputation, or expertise of the source user is for a particular community that is of interest to the participant user and is part of a large community.

24. The method of claim 23 wherein the particular community comprises a small subset of users of a larger community.

25. The method of claim 23 further comprising receiving via the network a selection from the participant user indicating that the particular community is of interest to the participant user.

26. The method of claim 1 wherein the item comprises web content including image, audio, or video content.

27. The method of claim 1 wherein the intensity value is adjusted a predetermined amount based on the data regarding the trustworthiness, reliability, credibility, reputation, or expertise of the source user.

28. The method of claim 1 wherein:

the processing further includes determining an interest category weight value for an interest category associated with the item; and the rank is further calculated based on the interest category weight value.

29. The method of claim 23 further comprising identifying that the interest category is of interest to the participant user.

30. The method of claim 29 further comprising:

receiving via the network a selection of the interest category from the participant user;

wherein the interest category is identified as being of interest to the participant user from the selection.

31. The method of claim 1 wherein:

the receiving includes receiving via the network multiple indications from multiple source users other than the participant user that the item is of current interest;

the processing includes processing the indications using the one or more computer processors including:

determining intensity values for the indications by determining an intensity value for each indication including adjusting the intensity value based on data regarding trustworthiness, reliability, credibility, reputation, or expertise of the source user of the indication; and calculating the rank for the item based on the adjusted intensity values for the indications.

32. The method of claim 9 wherein the indication is received in real time.

33. The method of claim 9 wherein the optional data comprises a menu selection made by the source user for the item.

34. The method of claim 33 wherein the menu selection comprises an interest category selection for the item.

35. The method of claim 9 wherein the optional data comprises a text entry made by the source user for the item.

36. The method of claim 35 wherein the text entry comprises a comment regarding the item.

37. The method of claim 9 wherein:
the optional data provided by the user with the indication results from a first activity taken by the source user in relation to the item which occurs in conjunction with a second activity taken by the source user in relation to the item; and
the determining further includes determining the intensity value based on second data provided with the indication identifying the second activity and adjusting the intensity value based on the source user providing the optional data resulting from the first activity with the indication.

38. The method of claim 37 wherein the first activity comprises an optional part of the second activity.

39. The method of claim 38 wherein the first activity comprises making a menu selection for the item and the second activity comprises making a submission that the item is of interest.

40. The method of claim 39 wherein the making the menu selection comprises making an interest category selection for the item.

41. The method of claim 38 wherein the first activity comprises making a text entry for the item and the second activity comprises making a submission that the item is of interest.

42. The method of claim 41 wherein the making the text entry comprises adding a comment regarding the item.

43. The method of claim 37 wherein the determining includes determining a baseline value for the intensity value based on the data provided with the indication identifying the second activity and adjusting the baseline value based on the source user providing with the indication the optional data resulting from the first activity.

44. The method of claim 9 wherein the intensity value is adjusted a predetermined amount based on the source user providing the data with the indication.

45. The method of claim 9 wherein the item comprises web content including image, audio, or video content.

46. The method of claim 9 wherein:
the processing further includes determining an interest category weight value for an interest category associated with the item; and
the rank is further calculated based on the interest category weight value.

47. The method of claim 46 further comprising identifying that the interest category is of interest to the participant user.

48. The method of claim 47 further comprising:
receiving via the network a selection of the interest category from the participant user;
wherein the interest category is identified as being of interest to the participant user from the selection.

49. The method of claim 9 wherein:
the receiving includes receiving via the network multiple indications from multiple source users other than the participant user that the item is of current interest;
the processing includes processing the indications using the one or more computer processors including:
determining intensity values for the indications by determining an intensity value for each indication including adjusting the intensity value based on the source user providing data with the indication; and
calculating the rank for the item based on the adjusted intensity values for the indications.

50. The method of claim 12 wherein the indication is received in real time.

51. The method of claim 12 wherein the quality of the indications previously received from the source user is relevance.

52. The method of claim 12 wherein the quality of the indications previously received from the source user is helpfulness.

53. The method of claim 12 wherein the quality of the indications previously received from the source user is erroneousness.

54. The method of claim 12 wherein the intensity value is adjusted a predetermined amount based on the source user providing the data with the indication.

55. The method of claim 12 wherein the item comprises web content including image, audio, or video content.

56. The method of claim 12 wherein:
the processing further includes determining an interest category weight value for an interest category associated with the item; and
the rank is further calculated based on the interest category weight value.

57. The method of claim 56 further comprising identifying that the interest category is of interest to the participant user.

58. The method of claim 57 further comprising:
receiving via the network a selection of the interest category from the participant user;
wherein the interest category is identified as being of interest to the participant user from the selection.

59. The method of claim 12 wherein:
the receiving includes receiving via the network multiple indications from multiple source users other than the participant user that the item is of current interest;
the processing includes processing the indications using the one or more computer processors including:
determining intensity values for the indications by determining an intensity value for each indication including adjusting the intensity value based on data regarding indications previously received from the source user of the indication for other items accessible by the source user via the network; and
calculating the rank for the item based on the adjusted intensity values for the indications.

60. The method of claim 15 wherein the indication is received in real time.

61. The method of claim 18 wherein the optional activity comprises an optional part of the second activity.

62. The method of claim 18 wherein the optional activity comprises making a menu selection for the item and the second activity comprises making a submission that the item is of interest.

63. The method of claim 62 wherein the making the menu selection comprises making an interest category selection for the item.

64. The method of claim 18 wherein the optional activity comprises making a text entry for the item and the second activity comprises making a submission that the item is of interest.

65. The method of claim 64 wherein the making the text entry comprises adding a comment regarding the item.

66. The method of claim 18 wherein the determining includes determining a baseline value for the intensity value based on the data provided with the indication identifying the second activity and adjusting the baseline value based on the data provided with the indication identifying the optional activity.

67. The method of claim 15 wherein the intensity value is adjusted a predetermined amount based on the data provided with the indication identifying the optional activity.

68. The method of claim 15 wherein the item comprises web content including image, audio, or video content.

69. The method of claim 15 wherein:
the processing further includes determining an interest category weight value for an interest category associated with the item; and
the rank is further calculated based on the interest category weight value.

70. The method of claim 69 further comprising identifying that the interest category is of interest to the participant user.

71. The method of claim 70 further comprising:
receiving via the network a selection of the interest category from the participant user;
wherein the interest category is identified as being of interest to the participant user from the selection.

72. The method of claim 15 wherein:
the receiving includes receiving via the network multiple indications from multiple source users other than the participant user that the item is of current interest;
the processing includes processing the indications using the one or more computer processors including:
determining intensity values for the indications by determining an intensity value for each indication including adjusting the intensity value based on data regarding an optional activity the source user of the indication has taken in relation to the item; and
calculating the rank for the item based on the adjusted intensity values for the indications.

73. A computer-implemented method of informing a participant user that an item accessible by the participant user via a network is of current interest, comprising:
receiving via the network an indication from a source user other than the participant user that the item is of current interest;
processing the indication using one or more computer processors including:
determining an intensity value for the indication including adjusting the intensity value based on data regarding at least one of (a) identity of the source user, (b) the source user providing data with the indication, (c) indications previously received from the source user for other items accessible by the source user via the network, or (d) an activity taken by the source user in relation to the item;
determining a time decay for the indication; and
calculating a rank for the item based on the intensity value and the time decay for the indication, the rank indicating a level of current interest of the item relative to other items accessible by the participant user via the network; and
informing the participant via the network that the item is of current interest based on the rank for the item.

74. The method of claim 73 wherein the indication is received in real time.

75. The method of claim 73 wherein the time decay is determined based on elapsed time from when the indication was received.

76. The method of claim 75 wherein the time decay causes the rank for the indication to decrease as the elapsed time from when the indication was received increases.

77. The method of claim 76 wherein the rank decreases exponentially as the elapsed time from when the indication was received increases.

78. The method of claim 73 wherein:
the rank is calculated based on the time decay after expiration of a predetermined time interval of elapsed time from when the indication was received; and
the time decay is determined based on the elapsed time from when the indication was received and the predefined time interval.

79. The method of claim 78 wherein the time decay is determined based on subtracting the predetermined time interval from the elapsed time from when the indication was received.

* * * * *

UNITED STATES PATENT AND TRADEMARK OFFICE
CERTIFICATE OF CORRECTION

PATENT NO. : 8,429,244 B2
APPLICATION NO. : 12/411500
DATED : April 23, 2013
INVENTOR(S) : Michael Nalmark It is certified that error appears in the above-identified patent and that said Letters Patent is hereby corrected as shown below:

In the Claims

Column 14, line 32, replace "the participant via" with -- the participant user via --.

Column 15, line 28, replace "and the time decay" with -- and a time decay --;

line 32, replace "the participant via" with -- the participant user via --;

line 54, replace "and the time decay" with -- and a time decay --; and line 58, replace "the participant via" with -- the participant user via --.

Column 20, line 15, replace "the participant via" with -- the participant user via --; and line 23, replace "for the indication" with -- for the item --.

Signed and Sealed this
Twenty-eighth Day of July, 2015

Michelle K. Lee
*Director of the United States Patent and Trademark Office*

UNITED STATES PATENT AND TRADEMARK OFFICE
CERTIFICATE OF CORRECTION

PATENT NO. : 8,429,244 B2  
APPLICATION NO. : 12/411500  
DATED : April 23, 2013  
INVENTOR(S) : Michael Naimark et al.

Page 1 of 1

It is certified that error appears in the above-identified patent and that said Letters Patent is hereby corrected as shown below:

In the Claims,

Column 14, line 32, replace "the participant via" with -- the participant user via --.

Column 15, line 28, replace "and the time decay" with -- and a time decay --;

line 32, replace "the participant via" with -- the participant user via --;

line 54, replace "and the time decay" with -- and a time decay --; and line 58, replace "the participant via" with -- the participant user via --.

Column 20, line 15, replace "the participant via" with -- the participant user via --; and line 23, replace "for the indication" with -- for the item --.

Signed and Sealed this
Eighth Day of September, 2015

Michelle K. Lee
*Director of the United States Patent and Trademark Office*